(12) United States Patent
Wu et al.

(10) Patent No.: US 12,710,652 B2
(45) Date of Patent: Aug. 18, 2026

(54) EYE-TRACKING SYSTEM INCLUDING A RING-SHAPED PRINTED CIRCUIT BOARD HAVING EXTENSIONS AND ILLUMINATION SOURCES COUPLED TO THE EXTENSIONS

(71) Applicant: META PLATFORMS TECHNOLOGIES, LLC, Menlo Park, CA (US)

(72) Inventors: Wei Wu, Bellevue, WA (US); Anthony Diego Draper, Sammamish, WA (US); Daniel Turowski, Redmond, WA (US); Mehmet Mutlu, Redmond, WA (US); Alfredo Bismuto, Redmond, WA (US); Qi Zhang, Kirkland, WA (US); Kuan Pei Yap, San Jose, CA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 18/306,937

(22) Filed: Apr. 25, 2023

(65) Prior Publication Data

US 2024/0012246 A1 Jan. 11, 2024

Related U.S. Application Data

(63) Continuation-in-part of application No. 17/862,231, filed on Jul. 11, 2022, now abandoned.

(51) Int. Cl.
*G02B 27/01* (2006.01)

(52) U.S. Cl.
CPC .. *G02B 27/0172* (2013.01); *G02B 2027/0138* (2013.01); *G02B 2027/014* (2013.01);
(Continued)

(58) Field of Classification Search
CPC ........ G02B 27/0172; G02B 2027/0138; G02B 2027/014; G02B 2027/0178;
(Continued)

(56) References Cited

U.S. PATENT DOCUMENTS

| | | | |
|---|---|---|---|
| 10,436,991 | B2 | 10/2019 | Jou et al. |
| 10,756,073 | B2 | 8/2020 | Kim et al. |

(Continued)

FOREIGN PATENT DOCUMENTS

| | | | |
|---|---|---|---|
| CA | 2846344 | A1 | 9/2014 |
| CN | 105431763 | B | 6/2018 |

(Continued)

OTHER PUBLICATIONS

European Search Report for European Patent Application No. 23183796.4, dated Nov. 20, 2023, 7 pages.

(Continued)

*Primary Examiner* — Ricardo Osorio
(74) *Attorney, Agent, or Firm* — McDermott Will & Schulte LLP

(57) ABSTRACT

Systems, methods, and devices for eye tracking are provided. A device may include at least one printed circuit board including a shape around a lens of the device. The device may also include a plurality of light emitting diodes arranged around the shape of the lens. The plurality of light emitting diodes may be configured to connect to the at least one printed circuit board. The plurality of light emitting diodes may also be configured to illuminate light directed to at least one eye of a user to cause at least one reflection of the at least one eye.

20 Claims, 18 Drawing Sheets

(52) U.S. Cl.
CPC ................ *G02B 2027/0178* (2013.01); *G02B 2027/0187* (2013.01)

(58) Field of Classification Search
CPC ........ G02B 2027/0187; G02B 27/0093; H05K 3/323; H05K 2201/0145; H05K 2201/10106; H05K 1/189; H05K 1/0313; H05K 2201/0154; H05K 1/0274
See application file for complete search history.

(56) References Cited

U.S. PATENT DOCUMENTS

| | | | | |
|---|---|---|---|---|
| 10,768,451 | B1 * | 9/2020 | Carlson | F21V 33/0004 |
| 10,775,616 | B1 | 9/2020 | Ouderkirk et al. | |
| 10,852,824 | B1 * | 12/2020 | Hatzilias | G02B 27/0093 |
| 11,067,807 | B2 | 7/2021 | Lee et al. | |
| 11,089,197 | B1 | 8/2021 | Taylor et al. | |
| 11,353,711 | B1 | 6/2022 | Freeman et al. | |
| 2017/0255011 | A1 | 9/2017 | Son et al. | |
| 2019/0101761 | A1 | 4/2019 | Ihmels | |
| 2019/0227309 | A1 | 7/2019 | Kadono et al. | |
| 2019/0361523 | A1 | 11/2019 | Sharma et al. | |
| 2020/0004023 | A1 | 1/2020 | Shin et al. | |
| 2020/0081253 | A1 | 3/2020 | Montevirgen et al. | |
| 2020/0150425 | A1 * | 5/2020 | Hatzilias | G02B 27/0093 |
| 2020/0203324 | A1 | 6/2020 | Shin et al. | |
| 2020/0209453 | A1 | 7/2020 | Kwon et al. | |
| 2020/0355929 | A1 * | 11/2020 | Zhang | G02B 27/425 |
| 2021/0011303 | A1 * | 1/2021 | Andreev | G02B 27/58 |
| 2021/0041692 | A1 * | 2/2021 | Zhang | G02B 27/0093 |
| 2021/0239883 | A1 * | 8/2021 | Georgiou | G02B 3/0056 |
| 2021/0325677 | A1 | 10/2021 | Gao et al. | |
| 2022/0287180 | A1 | 9/2022 | Yang et al. | |
| 2022/0302424 | A1 | 9/2022 | Yug | |
| 2022/0385881 | A1 * | 12/2022 | Wu | G06F 3/013 |
| 2023/0082063 | A1 * | 3/2023 | Kang | G02B 27/0172 345/633 |
| 2023/0185090 | A1 | 6/2023 | Schuck | |
| 2023/0185114 | A1 * | 6/2023 | Yu | G02B 27/0172 351/159.01 |
| 2023/0412780 | A1 | 12/2023 | Miller et al. | |
| 2024/0004190 | A1 * | 1/2024 | Edwin | G02B 27/0172 |
| 2024/0069363 | A1 * | 2/2024 | Caspari | G02C 11/04 |

FOREIGN PATENT DOCUMENTS

| | | | |
|---|---|---|---|
| CN | 113764470 | A | 12/2021 |
| CN | 115542573 | A | 12/2022 |
| KR | 102216694 | B1 | 2/2021 |
| KR | 20210103037 | A | 8/2021 |
| KR | 20230009723 | A | 1/2023 |
| TW | 200405056 | A | 4/2004 |
| TW | I646356 | B | 1/2019 |
| TW | 202101070 | A | 1/2021 |
| TW | 202122870 | A | 6/2021 |
| TW | I732207 | B | 7/2021 |
| TW | 202141121 | A | 11/2021 |
| WO | 2012034332 | A1 | 3/2012 |
| WO | 2021007134 | A1 | 1/2021 |

OTHER PUBLICATIONS

"How to Calculate Lens Working Distance," The Digital Picture.com, 4 pages, Retrieved from the Internet: URL: https://www.the-digital-picture.com/Photography-Tips/how-to-calculate-lens-working-distance.aspx, Retrieved on [Jan. 17, 2022].

Kassner M., et al., "Pupil: An Open Source Platform for Pervasive Eye Tracking and Mobile Gaze-based Interaction," arXiv:1405.0006v1, Apr. 30, 2014, 10 pages.

Shahinian H., et al., "Scanning Depth Sensor for See-Through AR Glasses," Proceedings of SPIE, 2019, vol. 11040, 7 pages.

Non-Final Office Action mailed Apr. 3, 2025 for U.S. Appl. No. 18/306,955, filed Apr. 25, 2023, 11 pages.

Machine English Translation of TWI646356B publication, 2019, 7 pages.

USPTO—892 form of Office Action mailed on Apr. 6, 2026 for corresponding U.S. Appl. No. 18/306,955, 1 page.

* cited by examiner

EYE-TRACKING SYSTEM INCLUDING A RING-SHAPED PRINTED CIRCUIT BOARD HAVING EXTENSIONS AND ILLUMINATION SOURCES COUPLED TO THE EXTENSIONS

CROSS-REFERENCE TO RELATED APPLICATIONS

This application is a continuation in part of U.S. Application No. 17,862,231 filed Jul. 11, 2022, entitled "Optical Assembly With Micro Light Emitting Diode (LED) As Eye-Tracking Near Infrared (nIR) Illumination Source", the entire contents of which are incorporated in their entirety herein by reference.

TECHNICAL FIELD

This patent application relates generally to optical assemblies using eye-tracking techniques, and more specifically, to systems and methods using a micro light emitting diode as an eye-tracking near infrared (NIR) illumination source. This patent application also relates generally to methods, apparatuses and computer program products for providing a flexible circuit board having light emitting diodes, around a lens, as illumination sources to facilitate eye tracking for artificial reality systems.

BACKGROUND

With recent advances in technology, prevalence and proliferation of content creation and delivery has increased greatly in recent years. In particular, interactive content such as virtual reality (VR) content, augmented reality (AR) content, mixed reality (MR) content, and content within and associated with a real and/or virtual environment (e.g., a "metaverse") has become appealing to consumers.

To facilitate delivery of this and other related content, service providers have endeavored to provide various forms of wearable display systems. One such example may be a head-mounted display (HMD) device, such as a wearable eyewear, a wearable headset, or eyeglasses. In some examples, the head-mounted display (HMD) device may project or direct light to form a first image and a second image, and with these images, to generate "binocular" vision for viewing by a user.

Eye-tracking may be used in some head-mounted display (HMD) devices. It may be important for components of an eye-tracking system to balance any number of system criteria, such as power consumption, size, weight, reliability, ease of manufacture, and cost.

BRIEF SUMMARY

Examples of the present disclosure are provided for developing a new architecture of an eye tracking system(s) for smart glasses (e.g., artificial reality glasses), which may be utilized in virtual reality (VR), augmented reality (AR), mixed reality (MR), hybrid reality, or the like, applications.

In this regard, the exemplary embodiments may provide a flexible structure including multiple light emitting diodes (LEDs) that may be mounted around the lens or around the frame, of smart glasses, as illumination sources. The light emitting diodes may illuminate near-infrared light. The flexible structure may be a flexible circuit board. In some example embodiments, the LEDs may have individually addressed electrically conductive wires/traces embedded within the flexible circuit board.

The flexible circuit board may have a shape such as an eye-shape ring to accommodate the lens or frame shape of the smart glasses. The LEDs may be extended to enable mechanically mounting on the frame of the smart glasses with the illumination surface of the LEDs having a perpendicular direction pointing at a center of rotation of an eyeball of a user (e.g., a user wearing the smart glasses). For safety, a device (e.g., a controller) may be connected to the flexible circuit board to control/regulate the current, voltage and/or power to the LEDs to enhance eye-safety protection and/or circuit protection associated with the LEDs. The LEDs may be arranged in a uniform manner along the lens or frame of the smart glasses to improve the illumination brightness and uniformity of light coverage on an eye(s) of a user.

In an example embodiment, the light illuminated/generated by the LEDs may be reflected from an eye(s) of a user and the reflected light (e.g., a glint(s)) of the eye(s) may be captured by one or more cameras. The one or more cameras may be direct view cameras. The location and orientation of the one or more cameras may be important for the efficiency of light reflected (e.g., the glint(s)) from the eye(s) based on a determined gaze angle. The one or more cameras may process data associated with the glint(s) to determine pupil location, gaze angle and/or a gaze direction of the eye(s). The one or more cameras may be arranged in the frame of the smart glasses.

In an example embodiment, a device for eye tracking is provided. The device may include one or more processors and a memory including computer program code instructions. The device may include at least one printed circuit board having a shape around a lens of the device. The device may also include a plurality of light emitting diodes arranged around the shape of the lens. The plurality of light emitting diodes may be configured to connect to the printed circuit board. The plurality of light emitting diodes may be configured to illuminate light directed to at least one eye of a user to cause at least one reflection of the at least one eye.

In another example embodiment, a method for eye tracking is provided. The method may include providing at least one printed circuit board having a shape around a lens of at least one device. The method may also include providing a plurality of light emitting diodes, arranged around the shape of the lens of the at least one device. The plurality of light emitting diodes may be configured to connect to the printed circuit board. The method may further include causing the plurality of light emitting diodes to illuminate light directed to at least one eye of a user to cause at least one reflection of the at least one eye.

In yet another example embodiment, a computer program product for eye tracking is provided. The computer program product includes at least one computer-readable storage medium having computer-executable program code instructions stored therein. The computer-executable program code instructions may include program code instructions configured to facilitate illumination, by a plurality of light emitting diodes arranged around a shape of a lens of at least one device and configured to connect to at least one printed circuit board. The facilitating illumination may be of light directed to at least one eye of a user to cause at least one reflection of the at least one eye. The at least one printed circuit board may have the shape around the lens of the at least one device. The computer program product may further include program code instructions configured to capture, based on the at least one reflection, at least one image of the at least one eye.

Additional advantages will be set forth in part in the description which follows or may be learned by practice.

The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF DRAWINGS

Features of the present disclosure are illustrated by way of example and not limited in the following figures, in which like numerals indicate like elements. One skilled in the art will readily recognize from the following that alternative examples of the structures and methods illustrated in the figures can be employed without departing from the principles described herein.

Figure 1:
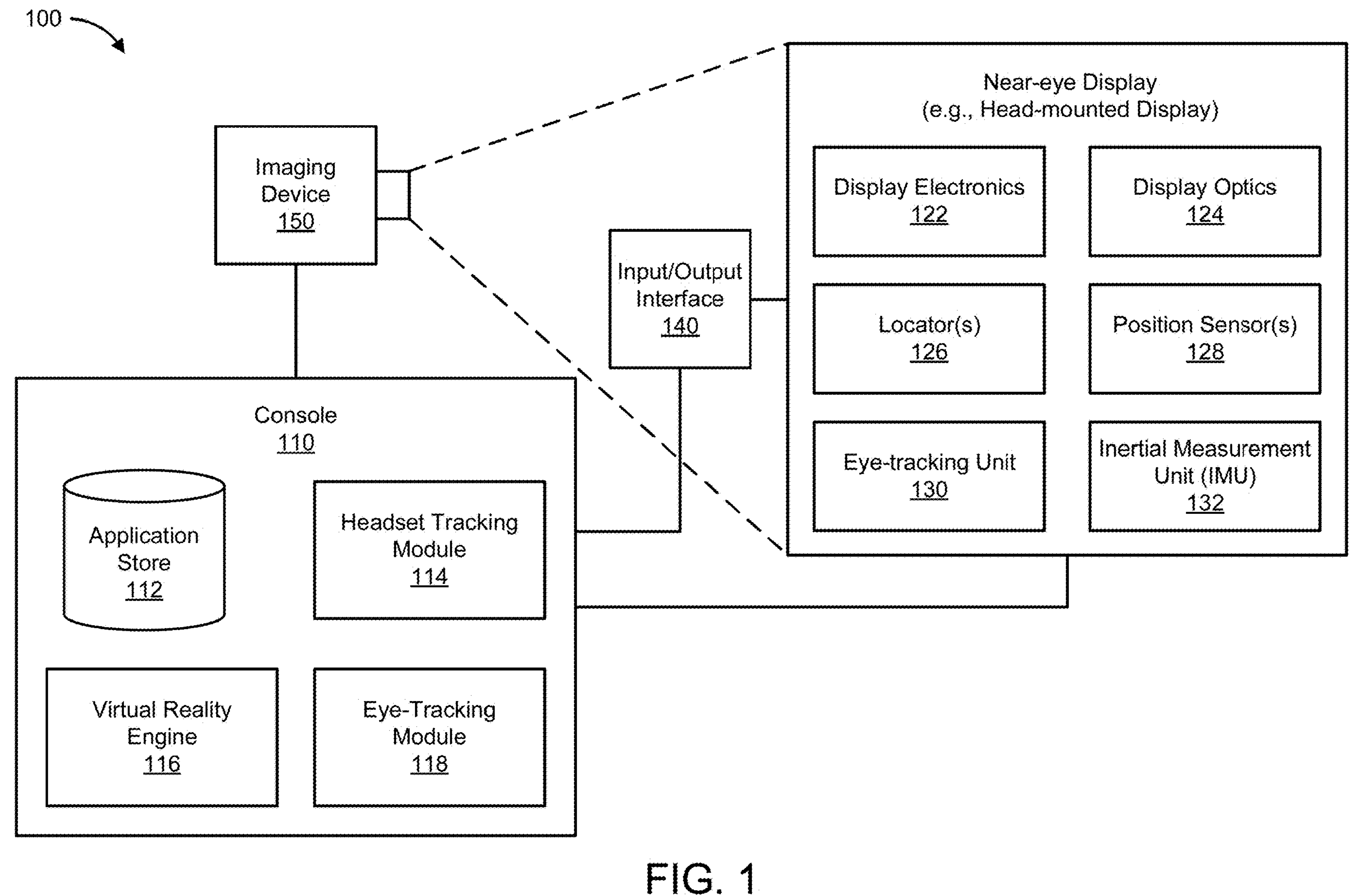
FIG. 1 illustrates a block diagram of an artificial reality system environment including a near-eye display, according to an example.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

For simplicity and illustrative purposes, the present application is described by referring mainly to examples thereof. In the following description, numerous specific details are set forth in order to provide a thorough understanding of the present application. It will be readily apparent, however, that the present application may be practiced without limitation to these specific details. In other instances, some methods and structures readily understood by one of ordinary skill in the art have not been described in detail so as not to unnecessarily obscure the present application. As used herein, the terms "a" and "an" are intended to denote at least one of a particular element, the term "includes" means includes but not limited to, the term "including" means including but not limited to, and the term "based on" means based at least in part on.

Eye-tracking may be used in some head-mounted display (HMD) devices. Some eye-tracking techniques are image-based and use near-infrared (NIR) illumination sources and cameras to track pupil and corneal reflections (e.g., glints). These reflections may be used to determine the direction of the user's gaze. To reduce the gaze error, it may be important to generate enough separated bright glints from inside the spherical region of the cornea close to the pupil center at a variety of possible gaze directions (e.g., ideally, all possible gaze directions).

To promote utility, it is desirable for an eye-tracking system to be able to detect gaze direction accurately for a broad population with a variety of eye shapes, eye sizes, head shapes, and head sizes, as well as different degrees of vision impairment. It is also desirable for an eye-tracking system to detect gaze direction accurately across a variety of use cases or scenarios. It is important for components of an eye-tracking system to balance system design criteria, such as low power consumption, size, weight, reliability, manufacturability, and cost.

Disclosed herein are systems, methods, and apparatuses that may use an optical assembly (OSM) with integrated near infrared (NIR) micro light emitting diodes (LEDs) for eye-tracking applications. The optical assembly may be cut into the shape of an eye opening using a laser trimming process. Using near infrared (NIR) micro light emitting diodes for illumination may simplify the architecture of the eye-tracking system and reduce manufacturing costs. In addition, the need to use a laser for eye tracking may be reduced or eliminated.

According to various examples, an eye-tracking system may include an optical assembly with integrated micro light emitting diodes. The optical assembly may include a substrate and a flexible printed circuit board assembly bonded to the substrate. Micro light emitting diodes may also be bonded to the substrate. A plurality of electrical conductors may be patterned on the substrate. The electrical conductors may electrically connect the micro light emitting diodes to the printed circuit board assembly. An optically clear adhesive layer may be adhered to the substrate. The optically clear adhesive layer may include an anti-reflective layer and an optical adhesive layer arranged in a stacked configuration. The eye-tracking system may be incorporated into a head-mounted display (HMD) device.

FIG. 1 illustrates a block diagram of an artificial reality system environment 100 including a near-eye display, according to an example. As used herein, a "near-eye display" may refer to a device (e.g., an optical device) that may be in close proximity to a user's eye. As used herein, "artificial reality" may refer to aspects of, among other things, a "metaverse" or an environment of real and virtual elements, and may include use of technologies associated with virtual reality (VR), augmented reality (AR), and/or mixed reality (MR). As used herein a "user" may refer to a user or wearer of a "near-eye display."

As shown in FIG. 1, the artificial reality system environment 100 may include a near-eye display 120, an optional external imaging device 150, and an optional input/output interface 140, each of which may be coupled to a console 110. The console 110 may be optional in some instances as the functions of the console 110 may be integrated into the near-eye display 120. In some examples, the near-eye display 120 may be a head-mounted display (HMD) that presents content to a user.

In some instances, for a near-eye display system, it may generally be desirable to expand an eye box, reduce display haze, improve image quality (e.g., resolution and contrast), reduce physical size, increase power efficiency, and increase or expand field of view (FOV). As used herein, "field of view" (FOV) may refer to an angular range of an image as seen by a user, which is typically measured in degrees as observed by one eye (for a monocular HMD) or both eyes (for binocular HMDs). Also, as used herein, an "eye box" may be a two-dimensional box that may be positioned in front of the user's eye from which a displayed image from an image source may be viewed.

In some examples, in a near-eye display system, light from a surrounding environment may traverse a "see-through" region of a waveguide display (e.g., a transparent substrate) to reach a user's eyes. For example, in a near-eye display system, light of projected images may be coupled into a transparent substrate of a waveguide, propagate within the waveguide, and be coupled or directed out of the waveguide at one or more locations to replicate exit pupils and expand the eye box.

In some examples, the near-eye display 120 may include one or more rigid bodies, which may be rigidly or non-rigidly coupled to each other. In some examples, a rigid coupling between rigid bodies may cause the coupled rigid bodies to act as a single rigid entity, while in other examples, a non-rigid coupling between rigid bodies may allow the rigid bodies to move relative to each other.

In some examples, the near-eye display 120 may be implemented in any suitable form-factor, including an HMD, a pair of glasses, or other similar wearable eyewear or device. Examples of the near-eye display 120 are further described below with respect to FIGS. 2 and 3. Additionally, in some examples, the functionality described herein may be used in an HMD or headset that may combine images of an environment external to the near-eye display 120 and artificial reality content (e.g., computer-generated images). Therefore, in some examples, the near-eye display 120 may augment images of a physical, real-world environment external to the near-eye display 120 with generated and/or overlaid digital content (e.g., images, video, sound, etc.) to present an augmented reality to a user.

In some examples, the near-eye display 120 may include any number of display electronics 122, display optics 124, and an eye-tracking unit 130. In some examples, the near eye display 120 may also include one or more locators 126, one or more position sensors 128, and an inertial measurement unit (IMU) 132. In some examples, the near-eye display 120 may omit any of the eye-tracking unit 130, the one or more locators 126, the one or more position sensors 128, and the inertial measurement unit (IMU) 132, or may include additional elements.

In some examples, the display electronics 122 may display or facilitate the display of images to the user according to data received from, for example, the optional console 110. In some examples, the display electronics 122 may include one or more display panels. In some examples, the display electronics 122 may include any number of pixels to emit light of a predominant color such as red, green, blue, white, or yellow. In some examples, the display electronics 122 may display a three-dimensional (3D) image, e.g., using stereoscopic effects produced by two-dimensional panels, to create a subjective perception of image depth.

In some examples, the display optics 124 may display image content optically (e.g., using optical waveguides and/or couplers) or magnify image light received from the display electronics 122, correct optical errors associated with the image light, and/or present the corrected image light to a user of the near-eye display 120. In some examples, the display optics 124 may include a single optical element or any number of combinations of various optical elements as well as mechanical couplings to maintain relative spacing and orientation of the optical elements in the combination. In some examples, one or more optical elements in the display optics 124 may have an optical coating, such as an anti-reflective coating, a reflective coating, a filtering coating, and/or a combination of different optical coatings.

In some examples, the display optics 124 may also be designed to correct one or more types of optical errors, such as two-dimensional optical errors, three-dimensional optical errors, or any combination thereof. Examples of two-dimensional errors may include barrel distortion, pincushion distortion, longitudinal chromatic aberration, and/or transverse chromatic aberration. Examples of three-dimensional errors may include spherical aberration, chromatic aberration field curvature, and astigmatism.

In some examples, the one or more locators 126 may be objects located in specific positions relative to one another and relative to a reference point on the near-eye display 120. In some examples, the optional console 110 may identify the one or more locators 126 in images captured by the optional external imaging device 150 to determine the artificial reality headset's position, orientation, or both. The one or more locators 126 may each be a light-emitting diode (LED), a corner cube reflector, a reflective marker, a type of light source that contrasts with an environment in which the near-eye display 120 operates, or any combination thereof.

In some examples, the external imaging device 150 may include one or more cameras, one or more video cameras, any other device capable of capturing images including the one or more locators 126, or any combination thereof. The optional external imaging device 150 may be configured to detect light emitted or reflected from the one or more locators 126 in a field of view of the optional external imaging device 150.

In some examples, the one or more position sensors 128 may generate one or more measurement signals in response to motion of the near-eye display 120. Examples of the one or more position sensors 128 may include any number of accelerometers, gyroscopes, magnetometers, and/or other motion-detecting or error-correcting sensors, or any combination thereof.

In some examples, the inertial measurement unit (IMU) 132 may be an electronic device that generates fast calibration data based on measurement signals received from the one or more position sensors 128. The one or more position sensors 128 may be located external to the inertial measurement unit (IMU) 132, internal to the inertial measurement unit (IMU) 132, or any combination thereof. Based on the one or more measurement signals from the one or more position sensors 128, the inertial measurement unit (IMU) 132 may generate fast calibration data indicating an estimated position of the near-eye display 120 that may be relative to an initial position of the near-eye display 120. For example, the inertial measurement unit (IMU) 132 may integrate measurement signals received from accelerometers over time to estimate a velocity vector and integrate the velocity vector over time to determine an estimated position of a reference point on the near-eye display 120. Alternatively, the inertial measurement unit (IMU) 132 may provide the sampled measurement signals to the optional console 110, which may determine the fast calibration data.

The eye-tracking unit 130 may include one or more eye-tracking systems. As used herein, "eye tracking" may refer to determining an eye's position or relative position, including orientation, location, and/or gaze of a user's eye. In some examples, an eye-tracking system may include an imaging system that captures one or more images of an eye and may optionally include a light emitter, which may generate light that is directed to an eye such that light reflected by the eye may be captured by the imaging system. In other examples, the eye-tracking unit 130 may capture reflected radio waves emitted by a miniature radar unit. These data associated with the eye may be used to determine or predict eye position, orientation, movement, location, and/or gaze.

In some examples, the near-eye display 120 may use the orientation of the eye to introduce depth cues (e.g., blur image outside of the user's main line of sight), collect heuristics on the user interaction in the virtual reality (VR) media (e.g., time spent on any particular subject, object, or frame as a function of exposed stimuli), some other functions that are based in part on the orientation of at least one of the user's eyes, or any combination thereof. In some examples, because the orientation may be determined for both eyes of the user, the eye-tracking unit 130 may be able to determine where the user is looking or predict any user patterns, etc.

In some examples, the input/output interface 140 may be a device that allows a user to send action requests to the optional console 110. As used herein, an "action request" may be a request to perform a particular action. For example, an action request may be to start or to end an application or to perform a particular action within the application. The input/output interface 140 may include one or more input devices. Example input devices may include a keyboard, a mouse, a game controller, a glove, a button, a touch screen, or any other suitable device for receiving action requests and communicating the received action requests to the optional console 110. In some examples, an action request received by the input/output interface 140 may be communicated to the optional console 110, which may perform an action corresponding to the requested action.

In some examples, the optional console 110 may provide content to the near-eye display 120 for presentation to the user in accordance with information received from one or more of external imaging device 150, the near-eye display 120, and the input/output interface 140. For example, in the example shown in FIG. 1, the optional console 110 may include an application store 112, a headset tracking module 114, a virtual reality engine 116, and an eye-tracking module 118. Some examples of the optional console 110 may include different or additional modules than those described in conjunction with FIG. 1. Functions further described below may be distributed among components of the optional console 110 in a different manner than is described here.

In some examples, the optional console 110 may include a processor and a non-transitory computer-readable storage medium storing instructions executable by the processor. The processor may include multiple processing units executing instructions in parallel. The non-transitory computer-readable storage medium may be any memory, such as a hard disk drive, a removable memory, or a solid-state drive (e.g., flash memory or dynamic random access memory (DRAM)). In some examples, the modules of the optional console 110 described in conjunction with FIG. 1 may be encoded as instructions in the non-transitory computer-readable storage medium that, when executed by the processor, cause the processor to perform the functions further described below. It should be appreciated that the optional console 110 may or may not be needed or the optional console 110 may be integrated with or separate from the near-eye display 120.

In some examples, the application store 112 may store one or more applications for execution by the optional console 110. An application may include a group of instructions that, when executed by a processor, generates content for presentation to the user. Examples of the applications may include gaming applications, conferencing applications, video playback application, or other suitable applications.

In some examples, the headset tracking module 114 may track movements of the near-eye display 120 using slow calibration information from the external imaging device 150. For example, the headset tracking module 114 may determine positions of a reference point of the near-eye display 120 using observed locators from the slow calibration information and a model of the near-eye display 120. Additionally, in some examples, the headset tracking module 114 may use portions of the fast calibration information, the slow calibration information, or any combination thereof, to predict a future location of the near-eye display 120. In some examples, the headset tracking module 114 may provide the estimated or predicted future position of the near-eye display 120 to the virtual reality engine 116.

In some examples, the virtual reality engine 116 may execute applications within the artificial reality system environment 100 and receive position information of the near-eye display 120, acceleration information of the near-eye display 120, velocity information of the near-eye display 120, predicted future positions of the near-eye display 120, or any combination thereof from the headset tracking module 114. In some examples, the virtual reality engine 116 may also receive estimated eye position and orientation information from the eye-tracking module 118. Based on the received information, the virtual reality engine 116 may determine content to provide to the near-eye display 120 for presentation to the user.

In some examples, the eye-tracking module 118 may receive eye-tracking data from the eye-tracking unit 130 and determine the position of the user's eye based on the eye tracking data. In some examples, the position of the eye may include an eye's orientation, location, or both relative to the near-eye display 120 or any element thereof. So, in these examples, because the eye's axes of rotation change as a function of the eye's location in its socket, determining the eye's location in its socket may allow the eye-tracking module 118 to more accurately determine the eye's orientation.

In some examples, a location of a projector of a display system may be adjusted to enable any number of design modifications. For example, in some instances, a projector may be located in front of a viewer's eye (i.e., "front-mounted" placement). In a front-mounted placement, in some examples, a projector of a display system may be located away from a user's eyes (i.e., "world-side"). In some examples, a head-mounted display (HMD) device may utilize a front-mounted placement to propagate light towards a user's eye(s) to project an image.

Figure 2:
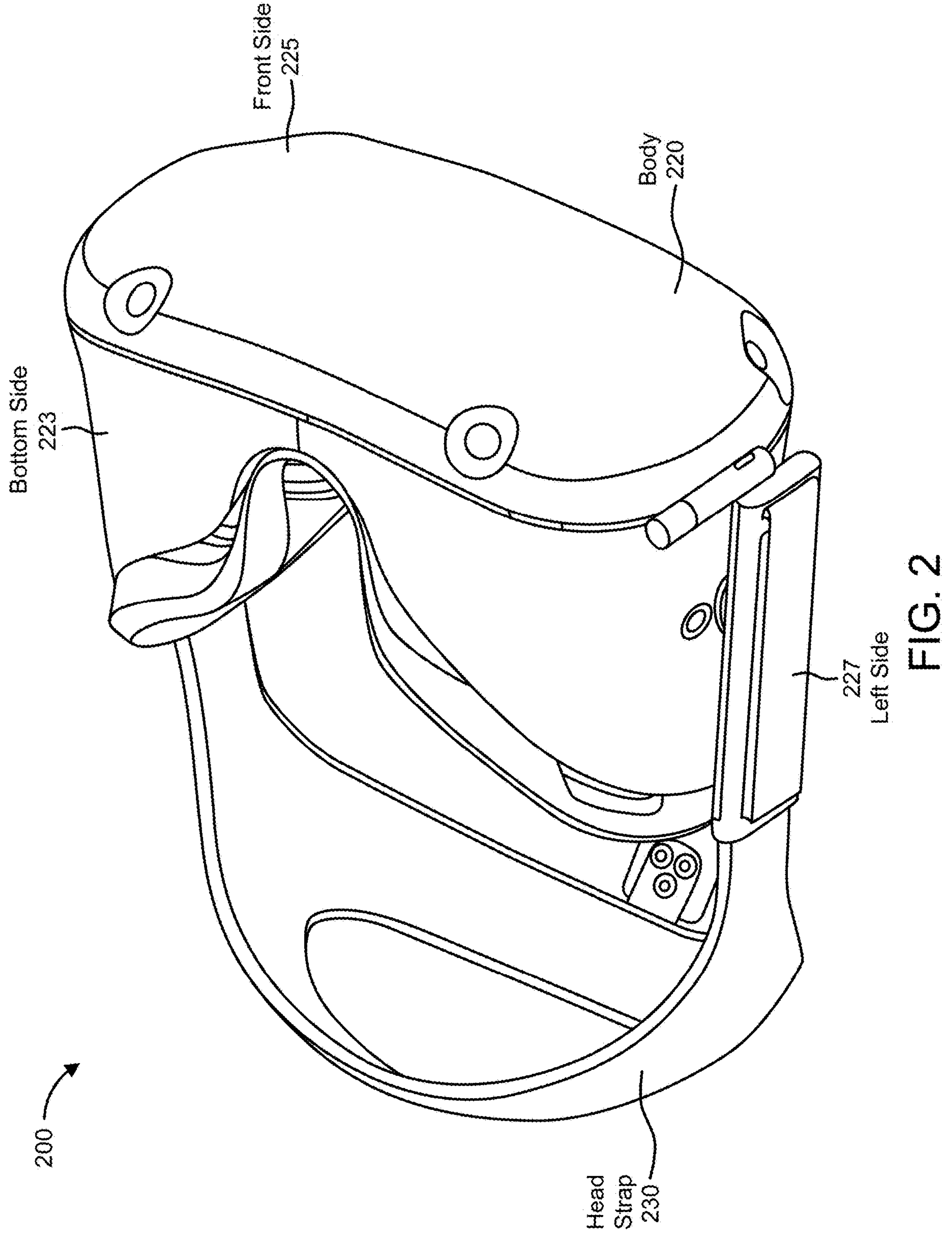
FIG. 2 illustrates a perspective view of a near-eye display in the form of a head-mounted display (HMD) device, according to an example.

FIG. 2 illustrates a perspective view of a near-eye display in the form of a head-mounted display (HMD) device 200, according to an example. In some examples, the HMD device 200 may be a part of a virtual reality (VR) system, an augmented reality (AR) system, a mixed reality (MR) system, another system that uses displays or wearables, or any combination thereof. In some examples, the HMD device 200 may include a body 220 and a head strap 230. FIG. 2 shows a bottom side 223, a front side 225, and a left side 227 of the body 220 in the perspective view. In some examples, the head strap 230 may have an adjustable or extendible length. In particular, in some examples, there may be a sufficient space between the body 220 and the head strap 230 of the HMD device 200 for allowing a user to mount the HMD device 200 onto the user's head. For example, the length of the head strap 230 may be adjustable to accommodate a range of user head sizes. In some examples, the HMD device 200 may include additional, fewer, and/or different components.

In some examples, the HMD device 200 may present, to a user, media or other digital content including virtual and/or augmented views of a physical, real-world environment with computer-generated elements. Examples of the media or digital content presented by the HMD device 200 may include images (e.g., two-dimensional (2D) or three-dimensional (3D) images), videos (e.g., 2D or 3D videos), audio, or any combination thereof. In some examples, the images and videos may be presented to each eye of a user by one or more display assemblies (not shown in FIG. 2) enclosed in the body 220 of the HMD device 200.

In some examples, the HMD device 200 may include various sensors (not shown), such as depth sensors, motion sensors, position sensors, and/or eye tracking sensors. Some of these sensors may use any number of structured or unstructured light patterns for sensing purposes. In some examples, the HMD device 200 may include an input/output interface 140 for communicating with a console 110, as described with respect to FIG. 1. In some examples, the HMD device 200 may include a virtual reality engine (not shown), but similar to the virtual reality engine 116 described with respect to FIG. 1, that may execute applications within the HMD device 200 and receive depth information, position information, acceleration information, velocity information, predicted future positions, or any combination thereof of the HMD device 200 from the various sensors.

In some examples, the information received by the virtual reality engine 116 may be used for producing a signal (e.g., display instructions) to the one or more display assemblies. In some examples, the HMD device 200 may include locators (not shown), but similar to the virtual locators 126 described in FIG. 1, which may be located in fixed positions on the body 220 of the HMD device 200 relative to one another and relative to a reference point. Each of the locators may emit light that is detectable by an external imaging device. This may be useful for the purposes of head tracking or other movement/orientation. It should be appreciated that other elements or components may also be used in addition or in lieu of such locators.

It should be appreciated that in some examples, a projector mounted in a display system may be placed near and/or closer to a user's eye (i.e., "eye-side"). In some examples, and as discussed herein, a projector for a display system shaped liked eyeglasses may be mounted or positioned in a temple arm (i.e., a top far corner of a lens side) of the eyeglasses. It should be appreciated that, in some instances, utilizing a back-mounted projector placement may help to reduce size or bulkiness of any required housing required for a display system, which may also result in a significant improvement in user experience for a user.

Figure 3:
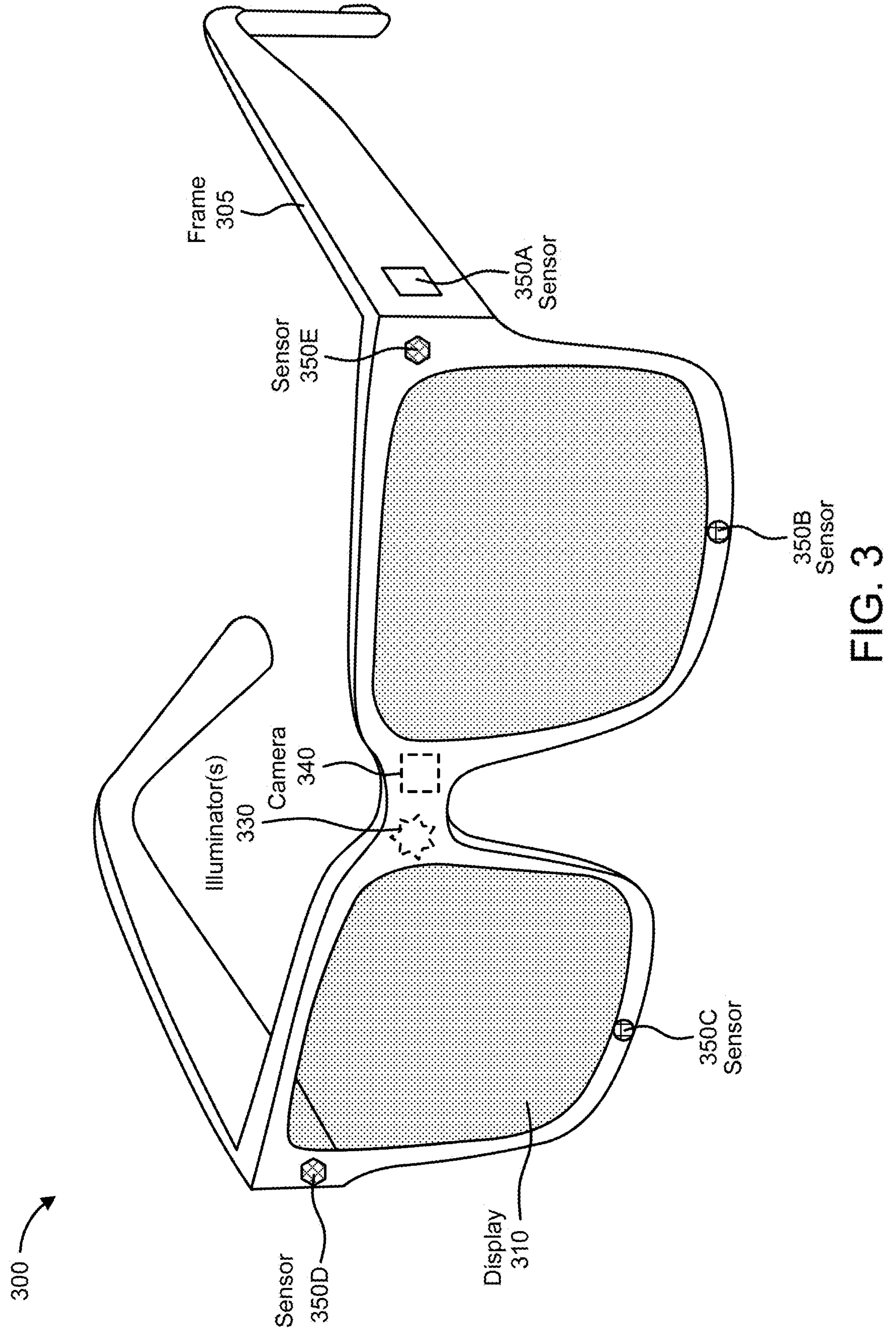
FIG. 3 illustrates a perspective view of a near-eye display in the form of a pair of glasses, according to an example.

FIG. 3 is a perspective view of a near-eye display 300 in the form of a pair of glasses (or other similar eyewear), according to an example. In some examples, the near-eye display 300 may be a specific example of near-eye display 120 of FIG. 1, and may be configured to operate as a virtual reality display, an augmented reality display, and/or a mixed reality display.

In some examples, the near-eye display 300 may include a frame 305 and a display 310. In some examples, the display 310 may be configured to present media or other content to a user. In some examples, the display 310 may include display electronics and/or display optics, similar to components described with respect to FIGS. 1-2. For example, as described above with respect to the near-eye display 120 of FIG. 1, the display 310 may include a liquid crystal display (LCD) display panel, a light-emitting diode (LED) display panel, or an optical display panel (e.g., a waveguide display assembly). In some examples, the display 310 may also include any number of optical components, such as waveguides, gratings, lenses, mirrors, etc.

In some examples, the near-eye display 300 may further include various sensors 350*a*, 350*b*, 350*c*, 350*d*, and 350*e* on or within a frame 305. In some examples, the various sensors 350*a*-350*e* may include any number of depth sensors, motion sensors, position sensors, inertial sensors, and/or ambient light sensors, as shown. In some examples, the various sensors 350*a*-350*e* may include any number of image sensors configured to generate image data representing different fields of views in one or more different directions. In some examples, the various sensors 350*a*-350*e* may be used as input devices to control or influence the displayed content of the near-eye display 300, and/or to provide an interactive virtual reality (VR), augmented reality (AR), and/or mixed reality (MR) experience to a user of the near-eye display 300. In some examples, the various sensors 350*a*-350*e* may also be used for stereoscopic imaging or other similar application.

In some examples, the near-eye display 300 may further include one or more illuminators 330 to project light into a physical environment. The projected light may be associated with different frequency bands (e.g., visible light, infra-red light, ultra-violet light, etc.), and may serve various purposes. In some examples, the one or more illuminator(s) 330 may be used as locators, such as the one or more locators 126 described above with respect to FIGS. 1-2.

In some examples, the near-eye display 300 may also include a camera 340 or other image capture unit. The camera 340, for instance, may capture images of the physical environment in the field of view. In some instances, the captured images may be processed, for example, by a virtual reality engine (e.g., the virtual reality engine 116 of FIG. 1) to add virtual objects to the captured images or modify physical objects in the captured images, and the processed images may be displayed to the user by the display 310 for augmented reality (AR) and/or mixed reality (MR) applications.

Figure 4:
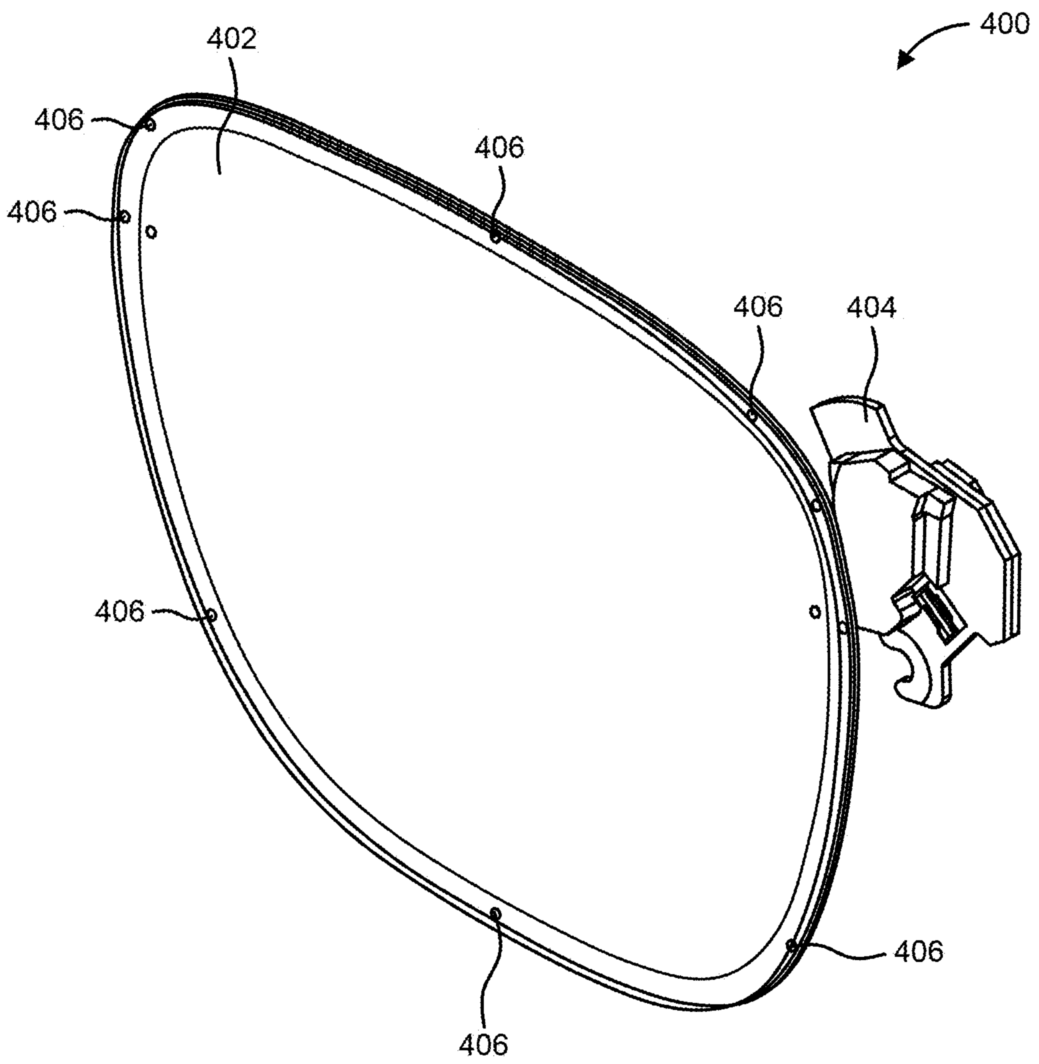
FIG. 4 illustrates a perspective view of an optical assembly with bonded micro light emitting diodes (LEDs), in accordance with various examples.

FIG. 4 illustrates a perspective view of an optical assembly 400 with bonded micro light emitting diodes, in accordance with various examples. In some examples, other illumination sources may be used. For example, lasers, such as vertical cavity surface emitting lasers (VCSELs) may be used as illumination sources. VCSELs coupled with photonic integrated waveguides may be used as illumination sources. The optical assembly 400 may be integrated as part of a head-mounted display (HMD) device, such as the near-eye display 300 of FIG. 3. In some examples, the optical assembly 400 may include an L1 layer 402. The L1 layer 402 may be implemented as a rigid, transparent substrate that provides a mechanical support for a flexible film substrate with light emitting diodes (LEDs) or other illumination sources. The L1 layer 402 may be formed from glass or another suitable material. In some examples, the L1 layer 402, which may also be referred to as a virtual image distance (VID) layer, may control a perceived distance of a displayed image. For example, by controlling the phase of light passing through the L1 layer 402 that is associated with a displayed image, the L1 layer 402 may cause the image to appear in front of or behind objects in a physical environment.

In some examples, the optical assembly 400 includes a printed circuit board assembly (PCBA) 404. The printed circuit board assembly 404 may provide an interface between the optical assembly 400 and other components of the head-mounted display (HMD) device. For example, the printed circuit board assembly 404 may communicate data and/or control signals between the optical assembly 400 and other components, such as control circuitry. As another example, the printed circuit board assembly 404 may conduct power from a power source, such as a battery, to the optical assembly 400.

In some examples, the printed circuit board assembly 404 is bonded to a substrate. For example, anisotropic conductive bonding (ACF), wire bonding, or other suitable techniques may be used to connect the printed circuit board assembly 404 to the conductive patterns on the substrate. Anisotropic conductive bonding, for example, may be used to connect illumination or display circuit patterns to a printed circuit board using anisotropic conductive adhesive and flex coils. This may provide a low-cost manufacturing process to interconnect multiple dense conductive traces. Anisotropic conductive bonding may enable electrical conductivity in one direction (e.g., vertical), but not another (e.g., lateral) after the high pressure and temperature process is completed. The substrate may be formed from a transparent material, such as glass, transparent polyimide, polyethylene terephthalate (PET), PEN, polycarbonate, cycloolefin polymer (COP), PMMA, polyvinyl chloride (PVC), and the like. The printed circuit board assembly 404 may be bonded to the substrate using anisotropic conductive film.

In some examples, micro light emitting diodes (LEDs) 406 (e.g., more than six micro LEDs) are bonded onto the substrate. For example, as illustrated in FIG. 4, the micro light emitting diodes 406 may be located around the perimeter of the substrate. The micro light emitting diodes 406 may have dimensions (e.g., length and/or width) less than 250 μm. In some examples, the micro light emitting diodes 406 may have a peak wavelength output in the range of 930 nm to 950 nm, with a spectral width (full width at half maximum (FWHM)) of 20-50 nm. The micro light emitting diodes 406 may have a radiant flux greater than 2 mW with an emission cone angle greater than 60° and a wall plug efficiency (WPE) greater than 5%.

The micro light emitting diodes 406 may be electrically connected to the printed circuit board assembly 404 via electrical conductors. For example, conductive (e.g., copper) wires may be laminated or otherwise integrated in the substrate. In some examples, a thin (e.g., 1-2 microns) seed layer including nickel and/or copper may be deposited via a plating or vacuum sputtering process. A modified semi-additive process (mSAP) may be used to pattern and coat a thicker (e.g., 10-20 microns) copper layer and a protective metal layer on the seed layer. The protective layer may include, for example, nickel, palladium, and/or gold layers, each of which may be 0.5-2 microns thick. A rigid glass layer with a thermal debonding film (TDF) layer may be applied on the back of the flexible printed circuit board assembly 404 for further steps of applying the micro light emitting diodes 406 via a bonding process, cutting eye shapes, and/or laminating printed circuit board connectors to connect the conductive traces. In some examples, transparent conductive electrodes may electrically connect the micro light emitting diodes 406 to the printed circuit board assembly 404. The transparent conductive electrodes may be sputtered onto a substrate and then patterned into isolated conductive traces. The conductive electrodes may be formed from indium doped tin oxide, aluminum doped zinc oxide, silver nanowires, nano-fiber meshes and/or polymeric materials with metal conductive traces, for example. As another example, the conductive electrodes may be formed from copper mesh lines comprising small copper lines separated by gaps. In some examples, the micro light emitting diodes and/or conductive traces may be encapsulated by an adhesive and/or another material. This material may also seal the edge of the optical assembly 400.

In some examples, an optically clear adhesive (OCA) layer may be located between the L1 layer 402 and the substrate. The optically clear adhesive layer may include a stack of anti-reflective layers and optical adhesive layers, e.g., arranged in an interleaved configuration. The stack of anti-reflective layers and optical adhesive layers may enable a total optical transmission exceeding 90% in the visible spectrum. In some examples, a side of the optically clear adhesive layer that faces the user's eye may have an anti-reflective coating that is characterized by a reflection of less than 10% at all angles of incidence less than 60°. In some examples, the optically clear adhesive layer may reduce the appearance of artifacts in the displayed image.

In some examples, a virtual imaging distance (VID1) lens element may be located on a side of the optical assembly 400 that faces the user's eye. The virtual imaging distance lens element may add a refractive power to adjust the perceived distance of a displayed image, for example, to accommodate users who use a head-mounted display (HMD) device with corrective lenses. For example, the L1 layer 402 on the world side may include a refractive power of, e.g., −0.65 diopter, which will bring the virtual image distance to, e.g., 1.5 m to provide high visual acuity for users. To correct the virtual imaging distance effect on the world side, another virtual imaging distance (e.g., VID1) layer having a refractive power of, e.g., −0.65 diopter may be included to compensate for the refractive power of the L1 layer 402. For users with myopia, then in addition to the −0.65 diopter with the L1 layer 402, an extra optical power may be integrated with the VID1 layer. The strength of the optical power may depend on the user's prescription.

In some examples, the optical assembly 400 may include one or more waveguide elements to direct a displayed image toward the user's eyes. The waveguide elements may be implemented in a layer located, for example, inward from a second virtual imaging distance (VID2) lens element, described herein.

In some examples, the optical assembly 400 may include a second virtual imaging distance (VID2) lens element. The second virtual imaging distance (VID2) lens element may be located on a world-facing side of the optical assembly 400. In some examples, the second virtual imaging distance (VID2) lens element has a refractive power, e.g., to compensate for a virtual imaging distance change introduced by another virtual imaging distance lens element. For example, the second virtual imaging distance lens element may have a spherical refractive power of +0.65 diopter. This may allow the user to see through the optical assembly correctly. In some examples, the second virtual imaging distance (VID2) lens element may provide variable visible transmission in the presence of ambient light to control the display contrast. This may facilitate use of the optical assembly 400 in both indoor and outdoor environments, e.g., with a dimmer. The second virtual imaging distance (VID2) lens element may be able to selectively control the amount of light that is passed through from the outside environment to promote consistency of the display contrast. In some examples, the second virtual imaging distance (VID2) lens element provides protection against environmental pollution, damage, and wear and tear associated with usage.

In some examples, the optical assembly 400 may include a holographic optical element (HOE). The holographic optical element may diffract near infrared (NIR) light from the eye reflection (e.g., glint) toward an optical sensor. Using the holographic optical element may result in faster stereo view calibration for eye-tracking, as well as faster eye-tracking authentication.

Figure 5:
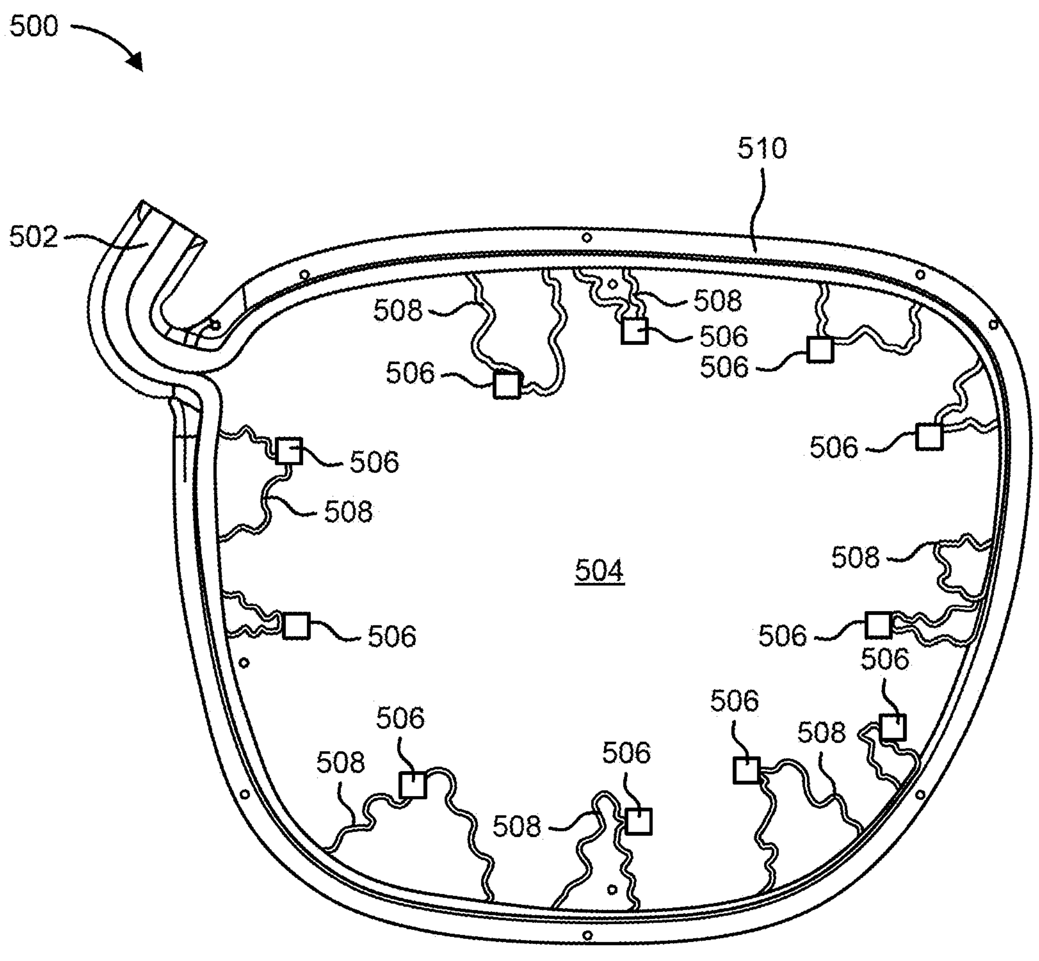
FIG. 5 illustrates a plan view of an optical assembly with bonded micro light emitting diodes, in accordance with various examples.

FIG. 5 illustrates a plan view of an optical assembly 500 with bonded micro light emitting diodes, in accordance with various examples. The optical assembly 500 may include a printed circuit board assembly (PCBA) 502 that provides an interface between the optical assembly 500 and other components of the head-mounted display (HMD) device. For example, the printed circuit board assembly 502 may communicate data and/or control signals between the optical assembly 500 and other components, such as control circuitry. As another example, the printed circuit board assembly 502 may conduct power from a power source, such as a battery, to the optical assembly 500.

In some examples, the printed circuit board assembly 502 is bonded to a patterned substrate 504. The patterned substrate 504 may be formed from a transparent material, such as glass, transparent polyimide, polyethylene terephthalate (PET), PEN, polycarbonate, cyclo-olefin polymer (COP), PMMA, polyvinyl chloride (PVC), and the like. In some examples, the patterned substrate 504 includes electrical conductors, e.g., conductive traces or smaller conductors, arranged on the surface or under the surface to form a pattern. The printed circuit board assembly 502 may be bonded to the patterned substrate 504 using anisotropic conductive film.

In some examples, micro light emitting diodes (LEDs) 506 (e.g., more than six micro LEDs) are bonded onto the patterned substrate 504. As illustrated in FIG. 5, the micro light emitting diodes 506 may be located in an interior region of the patterned substrate 504. Locating the micro light emitting diodes 506 in an interior region of the patterned substrate 504 may provide more uniform illumination in the eye box. As a result, when a strong refractive power is integrated for vision correction, illumination may be more uniform. In addition, shorter eye-relief distances may be realized because the light from the micro light emitting diodes 506 may travel a shorter distance to the user's eye. The micro light emitting diodes 506 may have dimensions (e.g., length and/or width) less than 250 μm. In some examples, the micro light emitting diodes 506 may have a peak wavelength output in the range of 930 nm to 950 nm, with a spectral width (full width at half maximum (FWHM)) of 20-50 nm. The micro light emitting diodes 506 may have a radiant flux greater than 2 mW with an emission cone angle greater than 60° and a wall plug efficiency (WPE) greater than 5%. In some alternative examples, the micro LEDs 506 may also be located behind the lens (BTL) of the optical assembly 500. In some other alternative examples, the micro LEDs 506 may be located slightly inside (e.g., in the interior region of the patterned substrate 504) the frame 510 of the optical assembly 500 and may emit light inward (e.g., towards a center of the lens), which may reduce the conspicuity associated with the emission of the micro LEDs 506 of the optical assembly 500.

Figure 7:
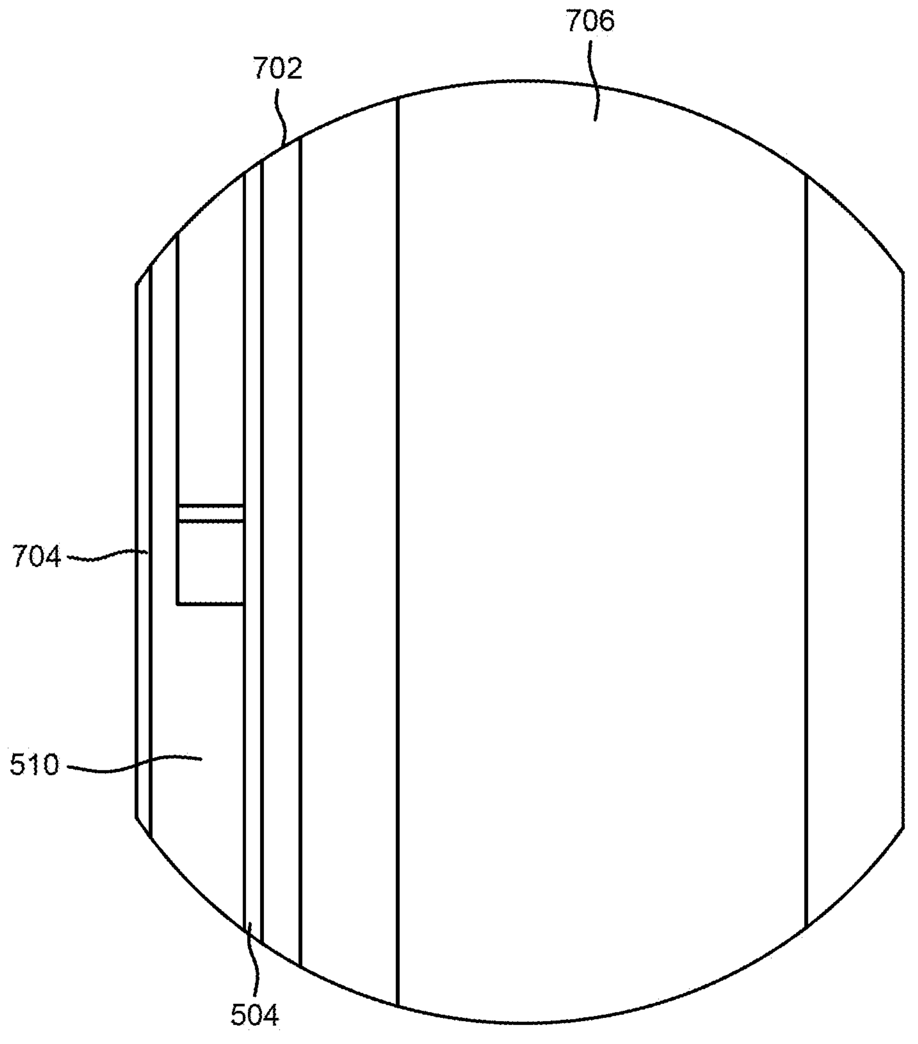
FIG. 7 illustrates a cross-sectional view of a patterned substrate, an encapsulating material, a thermal debonding film, a protective film, and a glass carrier, according to an example.

The micro light emitting diodes 506 may be electrically connected to the printed circuit board assembly 502 via electrical conductors 508. For example, conductive (e.g., copper) wires may be laminated or otherwise integrated in the substrate. In some examples, a thin (e.g., 1-2 microns) seed layer including nickel and/or copper may be deposited via a plating or vacuum sputtering process. A modified semi-additive process (mSAP) may be used to pattern and coat a thicker (e.g., 10-20 microns) copper layer and a protective metal layer on the seed layer. The protective layer may include, for example, nickel, palladium, and/or gold layers, each of which may be 0.5-2 microns thick. A rigid glass layer with a thermal debonding film (TDF) layer may be applied on the back of the printed circuit board assembly 502 for further steps of applying the micro light emitting diodes 506 via a bonding process, cutting eye shapes, and/or laminating printed circuit board connectors to connect the conductive traces. In some examples, transparent conductive electrodes may electrically connect the micro light emitting diodes 506 to the printed circuit board assembly 502. The transparent conductive electrodes may be sputtered onto a substrate and then patterned into isolated conductive traces. The conductive electrodes may be formed from indium doped tin oxide, aluminum doped zinc oxide, silver nanowires, nano-fiber meshes and/or polymeric materials with metal conductive traces, for example. As another example, the conductive electrodes may be formed from copper mesh lines comprising small copper lines separated by gaps. In some examples, the micro light emitting diodes and/or conductive traces may be encapsulated by an adhesive and/or another encapsulating material 510. This encapsulating material 510 may also seal the edge of the optical assembly 500. FIG. 7 illustrates a cross sectional view of the patterned substrate 504, the encapsulating material 510, a thermal debonding film 702, a protective film 704, and a glass carrier 706. The glass carrier 706 may be removed after the optical assembly 500 has been manufactured.

Figure 6:
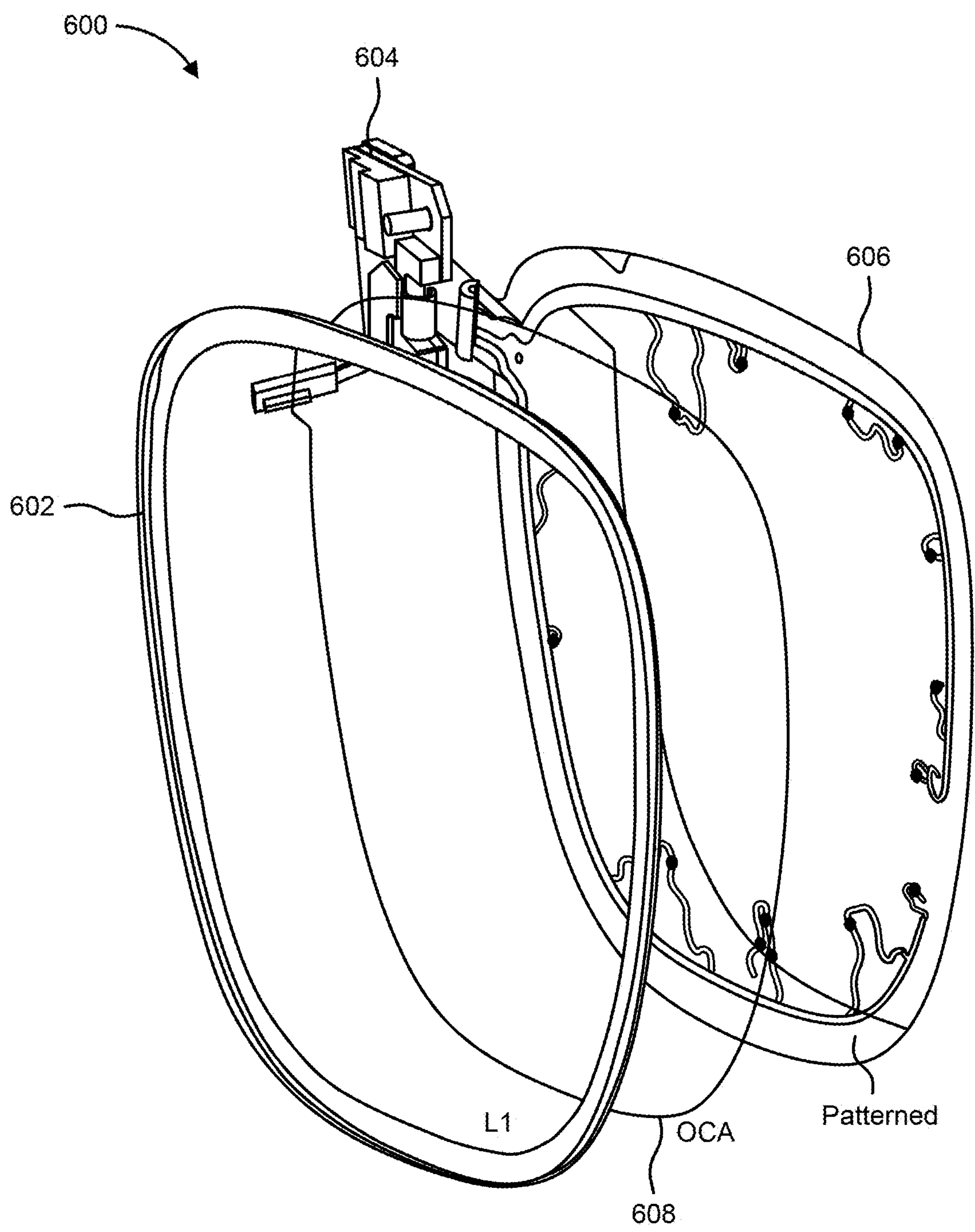
FIG. 6 illustrates an expanded view of an optical assembly with bonded micro light emitting diodes, in accordance with various examples.

FIG. 6 illustrates an expanded view of an optical assembly 600 with bonded micro light emitting diodes, in accordance with various examples. In some examples, other illumination sources may be used. For example, lasers, such as vertical cavity surface emitting lasers (VCSELs) may be used as illumination sources. VCSELs coupled with photonic integrated waveguides may be used as illumination sources. The optical assembly 600 may be integrated as part of a head-mounted display (HMD) device, such as the near-eye display 300 of FIG. 3. In some examples, the optical assembly 600 may include an L1 layer 602. The L1 layer 602 may be implemented as a rigid, transparent substrate that provides a mechanical support for a flexible film substrate with light emitting diodes (LEDs) or other illumination sources. The L1 layer 602 may be formed from glass or another suitable material. In some examples, the L1 layer 602, which may also be referred to as a virtual image distance (VID) layer, may control a perceived distance of a displayed image. For example, by controlling the phase of light passing through the L1 layer 602 that is associated with a displayed image, the L1 layer 602 may cause the image to appear in front of or behind objects in a physical environment.

In some examples, the optical assembly 600 includes a printed circuit board assembly (PCBA) 604. The printed circuit board assembly 604 may provide an interface between the optical assembly 600 and other components of the head-mounted display (HMD) device. For example, the printed circuit board assembly 604 may communicate data and/or control signals between the optical assembly 600 and other components, such as control circuitry. As another example, the printed circuit board assembly 604 may conduct power from a power source, such as a battery, to the optical assembly 600.

In some examples, the printed circuit board assembly 604 is bonded to a substrate 606. The substrate 606 may be formed from a transparent material, such as glass, transparent polyimide, polyethylene terephthalate (PET), PEN, polycarbonate, cyclo-olefin polymer (COP), PMMA, polyvinyl chloride (PVC, and the like. The printed circuit board assembly 604 may be bonded to the substrate 606 using anisotropic conductive film.

In some examples, micro light emitting diodes (LEDs) (e.g., more than six micro LEDs) are bonded onto the substrate 606. The micro light emitting diodes may have dimensions (e.g., length and/or width) less than 250 μm. In some examples, the micro light emitting diodes may have a peak wavelength output in the range of 930 nm to 950 nm, with a spectral width (full width at half maximum (FWHM)) of 20-50 nm. The micro light emitting diodes may have a radiant flux greater than 2 mW with an emission cone angle greater than 60° and a wall plug efficiency (WPE) greater than 5%.

The micro light emitting diodes may be electrically connected to the printed circuit board assembly 604 via electrical conductors. For example, conductive (e.g., copper) wires may be laminated or otherwise integrated in the substrate 606. In some examples, transparent conductive electrodes may electrically connect the micro light emitting diodes to the printed circuit board assembly 604. In some examples, a thin (e.g., 1-2 microns) seed layer including nickel and/or copper may be deposited via a plating or vacuum sputtering process. A modified semi-additive process (mSAP) may be used to pattern and coat a thicker (e.g., 10-20 microns) copper layer and a protective metal layer on the seed layer. The protective layer may include, for example, nickel, palladium, and/or gold layers, each of which may be 0.5-2 microns thick. A rigid glass layer with a thermal debonding film (TDF) layer may be applied on the back of the flexible printed circuit board assembly 604 for further steps of applying the micro light emitting diodes via a bonding process, cutting eye shapes, and/or laminating printed circuit board connectors to connect the conductive traces. The conductive electrodes may be formed from indium doped tin oxide, aluminum doped zinc oxide, silver nanowires, nano-fiber meshes and/or polymeric materials with metal conductive traces, for example. As another example, the conductive electrodes may be formed from copper mesh lines comprising small copper lines separated by gaps. In some examples, the micro light emitting diodes and/or conductive traces may be encapsulated by an adhesive and/or another material. This material may also seal the edge of the optical assembly 600.

In some examples, an optically clear adhesive (OCA) layer 608 may be located between the L1 layer 602 and the substrate 606. The optically clear adhesive layer 608 may include a stack of anti-reflective layers and optical adhesive layers. The stack of layers may enable a total optical transmission exceeding 90% in the visible spectrum. In some examples, a side of the optically clear adhesive layer 608 that faces the user's eye may have an anti-reflective coating that is characterized by a reflection of less than 10% at all angles of incidence less than 60°. In some examples, the optically clear adhesive layer 608 may reduce the appearance of artifacts in the displayed image.

In some examples, a virtual imaging distance (VID1) lens element may be located on a side of the optical assembly 600 that faces the user's eye. The virtual imaging distance lens element may add a refractive power to adjust the perceived distance of a displayed image, for example, to accommodate users who use a head-mounted display (HMD) device with corrective lenses. For example, the L1 layer 602 on the world side may include a refractive power of, e.g., −0.65 diopter, which will bring the virtual image distance to, e.g., 1.5 m to provide high visual acuity for users. To correct the virtual imaging distance effect on the world side, another virtual imaging distance (e.g., VID1) layer having a refractive power of, e.g., +0.65 diopter may be included to compensate for the refractive power of the L1 layer 602. For users with myopia, then in addition to the −0.65 diopter with the L1 layer 602, an extra optical power may be integrated with the VID1 layer. The strength of the optical power may depend on the user's prescription.

In some examples, the optical assembly 600 may include one or more waveguide elements to direct a displayed image toward the user's eyes. The waveguide elements may be implemented in a layer located, for example, inward from a second virtual imaging distance (VID2) lens element, described herein.

In some examples, the optical assembly 600 may include a second virtual imaging distance (VID2) lens element having a refractive power. The second virtual imaging distance (VID2) lens element may be located on a world-facing side of the optical assembly 600. In some examples, the second virtual imaging distance (VID2) lens element may have a refractive power, e.g., to compensate for a virtual imaging distance change introduced by another virtual imaging distance lens element. For example, the second virtual imaging distance lens element may have a spherical refractive power of +0.65 diopter. This may allow the user to see through the optical assembly correctly. In some examples, the second virtual imaging distance (VID2) lens element may provide variable visible transmission in the presence of ambient light to control the display contrast. This may facilitate use of the optical assembly 600 in both indoor and outdoor environments, e.g., with a dimmer. The second virtual imaging distance (VID2) lens element may be able to selectively control the amount of light that is passed through from the outside environment to promote consistency of the display contrast. In some examples, the second virtual imaging distance (VID2) lens element provides protection against environmental pollution, damage, and wear and tear associated with usage.

In some examples, the optical assembly 600 may include a holographic optical element (HOE). The holographic optical element may diffract near infrared (NIR) light from the eye reflection (e.g., glint) toward an optical sensor. Using the holographic optical element may result in faster stereo view calibration for eye-tracking, as well as faster eye-tracking authentication.

Figure 8:
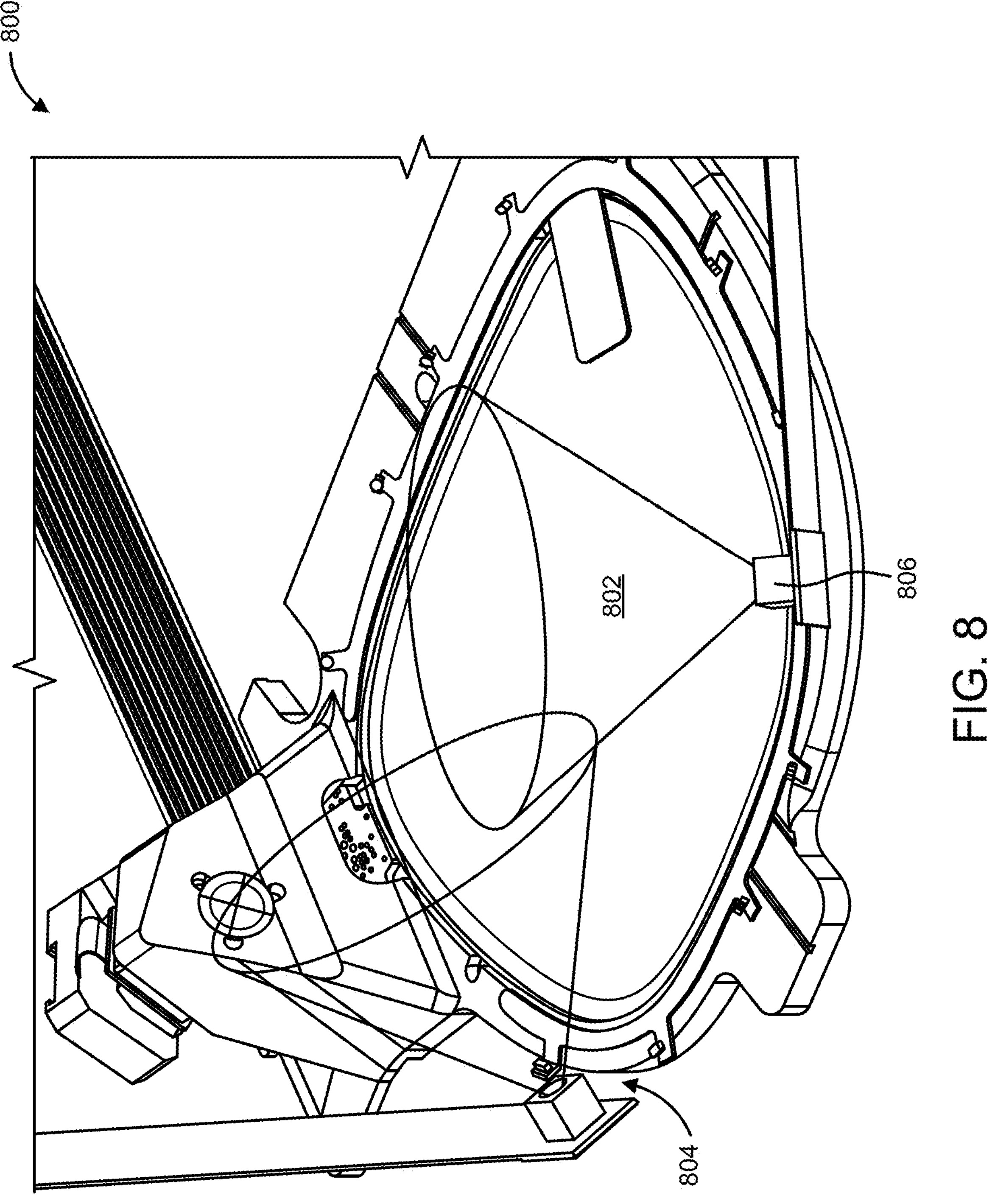
FIG. 8 illustrates a diagram of an example head-mounted display (HMD) device according to various examples.

In some examples, an optical assembly may be incorporated into a head-mounted display (HMD) device. FIG. 8 illustrates a diagram of an example head-mounted display (HMD) device 800 according to various examples. The head-mounted display (HMD) device 800 may include an optical assembly (OSM) 802 as described herein. In some examples, the optical assembly 802 includes integrated near infrared (NIR) micro light emitting diodes (LEDs) as illumination sources. Additional near infrared (NIR) micro light emitting diodes (LEDs) may be located on a tapering edge of the frame and may be oriented to point toward the rotational center of the user's eyeball as additional illumination sources.

In some examples, the head-mounted display (HMD) device 800 includes direct-view camera modules 804, 806 mounted on a frame 808 of the head-mounted display (HMD) device 800. The direct-view camera modules 804, 806 are positioned to capture images of the user's eyes when the eyes are illuminated by the near infrared (NIR) micro light emitting diodes (LEDs). Reflections (e.g., glints) in the images may be used to determine a direction of a gaze of the user.

In some examples, the direct-view camera modules 804, 806 may be operable at least at the wavelength range between 800 nm and 965 nm with a 50% cutoff. The dimensions of the direct-view camera modules 804, 806 may be less than 3 mm by 3 mm to ensure that the direct-view camera modules 804, 806 are properly sized for the frame of the head-mounted display (HMD) device 800. The frame may be tapered on its edge to facilitate placement of the direct-view camera modules 804, 806 at an angle in the range of approximately 10° to 80°. In some examples, the direct-view camera modules 804, 806 may be (e.g., nominally) pointed toward a pupil center of an eye(s).

In some examples, the working distance of the direct-view camera modules 804, 806 may be between 13 mm and 42 mm. The diagonal field of view of the direct-view camera modules 804, 806 may be at least 60°. In some examples, the direct-view camera modules 804, 806 may have a resolution of at least 1 pixel per mm at the object plane.

Additional Exemplary Eye Tracking Systems Regarding Around the Lens Features

Eye tracking (ET) technology has many applications for augmented reality and virtual reality devices. An often utilized eye-tracking technique may be image-based, which may use illumination sources and cameras to track pupil and corneal reflections (e.g., glints) and detect the gaze direction of an eye. Some existing eye tracking systems may have challenges in reducing eye gaze error. For instance, some existing eye tracking systems may have challenges in predicting pupil and corneal locations of eyes, and a gaze angle which may increase eye gaze errors.

To reduce the eye gaze error, it may be important to generate enough separated bright glints formed in a spherical region of a cornea, of an eye of a user, close to the eye pupil center at all the possible gaze directions. However, reducing the eye gaze error has been challenging for many existing eye tracking systems. Additionally, the different eye shapes, head sizes, different degrees of vision, as well as vision impairments of users in various scenarios may also cause challenges. In this regard, for example, some existing eye tracking systems may have difficulty to cover a broad population of users having different eye/head shapes and sizes and different degrees of vision impairment, while using augmented reality or virtual reality in particular instances. In addition, some existing eye tracking systems may face challenges in achieving and balancing other system requirements such as low power consumption, reduced size/weight, aesthetics, reliability, manufacturability, and low costs.

In view of the foregoing drawbacks and in order to achieve these system requirements, it may be beneficial to provide an efficient and reliable eye tracking system having a new architecture for illumination and capture of glints.

Some embodiments of the present disclosure will now be described more fully hereinafter with reference to the accompanying drawings, in which some, but not all embodiments of the disclosure are shown. Indeed, various embodiments of the disclosure may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the disclosure. Moreover, the term "exemplary", as used herein, is not provided to convey any qualitative assessment, but instead merely to convey an illustration of an example. Thus, use of any such terms should not be taken to limit the spirit and scope of embodiments of the disclosure.

As defined herein a "computer-readable storage medium," which refers to a non-transitory, physical or tangible storage medium (e.g., volatile or non-volatile memory device), may be differentiated from a "computer-readable transmission medium," which refers to an electromagnetic signal.

As referred to herein, glint(s) or glint image(s) may refer to detection, or image capture, of intended light reflected at an angle from a surface of one or more eyes. The light may be illuminated by a light source(s) onto the one or more eyes (e.g., a cornea, a pupil of the eyes).

As referred to herein, a direct view camera(s) may refer to a camera(s) that is configured to directly view an eye(s) of a user. The direct view camera(s) may, for example, be arranged/pointed towards an eye(s) of a user such that the direct view camera(s) may capture a glint image(s) and/or a pupil image(s).

As referred to herein, a Metaverse may denote an immersive virtual space or world in which devices may be utilized in a network in which there may, but need not, be one or more social connections among users in the network or with an environment in the virtual space or world. A Metaverse or Metaverse network may be associated with three-dimensional (3D) virtual worlds, online games (e.g., video games), one or more content items such as, for example, images, videos, non-fungible tokens (NFTs) and in which the content items may, for example, be purchased with digital currencies (e.g., cryptocurrencies) and other suitable currencies. In some examples, a Metaverse or Metaverse network may enable the generation and provision of immersive virtual spaces in which remote users may socialize, collaborate, learn, shop and/or engage in various other activities within the virtual spaces, including through the use of Augmented/Virtual/Mixed Reality.

It is to be understood that the methods and systems described herein are not limited to specific methods, specific components, or to particular implementations. It is also to be understood that the terminology used herein is for the purpose of describing particular embodiments only and is not intended to be limiting.

Exemplary System Architecture

Figure 9:
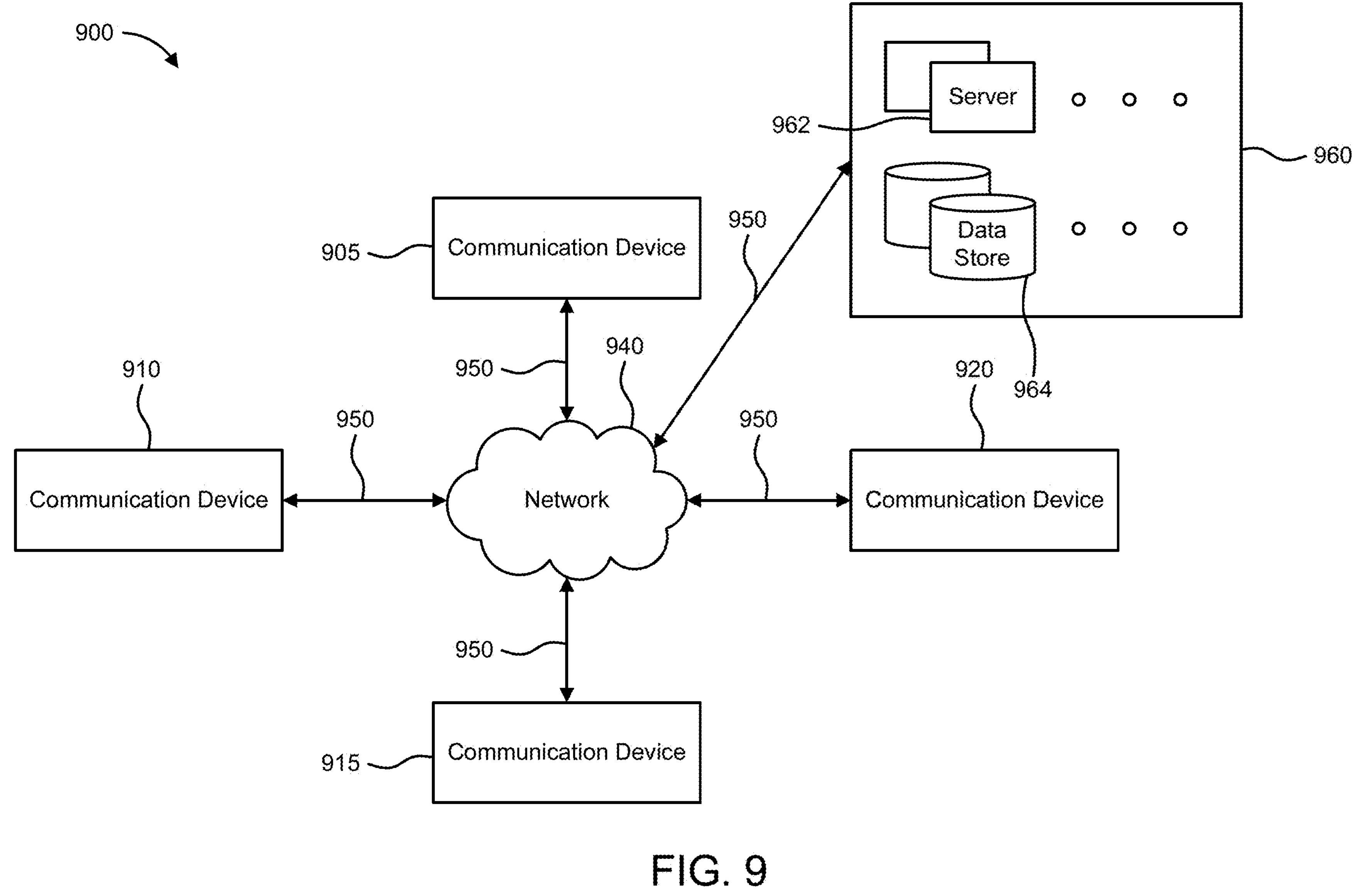
FIG. 9 is a diagram of an exemplary network environment in accordance with an example of the present disclosure.

Reference is now made to FIG. 9, which is a block diagram of a system according to exemplary embodiments. As shown in FIG. 9, the system 900 may include one or more communication devices 905, 910, 915 and 920 and a network device 960. Additionally, the system 900 may include any suitable network such as, for example, network 940. In some examples, the network 940 may be a Metaverse network. In other examples, the network 940 may be any suitable network capable of provisioning content and/or facilitating communications among entities within, or associated with the network. As an example and not by way of limitation, one or more portions of network 940 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 940 may include one or more networks 940.

Links 950 may connect the communication devices 905, 910, 915 and 920 to network 940, network device 960 and/or to each other. This disclosure contemplates any suitable links 950. In some exemplary embodiments, one or more links 950 may include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In some exemplary embodiments, one or more links 950 may each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 950, or a combination of two or more such links 950. Links 950 need not necessarily be the same throughout system 900. One or more first links 950 may differ in one or more respects from one or more second links 950.

In some exemplary embodiments, communication devices 905, 910, 915, 920 may be electronic devices including hardware, software, or embedded logic components or a combination of two or more such components and capable of carrying out the appropriate functionalities implemented or supported by the communication devices 905, 910, 915, 920. As an example, and not by way of limitation, the communication devices 905, 910, 915, 920 may be a computer system such as for example smart glasses, an augmented/virtual reality device, a desktop computer, notebook or laptop computer, netbook, a tablet computer (e.g., a smart tablet), e-book reader, Global Positioning System (GPS) device, camera, personal digital assistant (PDA), handheld electronic device, cellular telephone, smartphone, smart watches, charging case, or any other suitable electronic device, or any suitable combination thereof. The communication devices 905, 910, 915, 920 may enable one or more users to access network 940. The communication devices 905, 910, 915, 920 may enable a user(s) to communicate with other users at other communication devices 905, 910, 915, 920.

Network device 960 may be accessed by the other components of system 900 either directly or via network 940. As an example and not by way of limitation, communication devices 905, 910, 915, 920 may access network device 960 using a web browser or a native application associated with network device 960 (e.g., a mobile social-networking application, a messaging application, another suitable application, or any combination thereof) either directly or via network 940. In particular exemplary embodiments, network device 960 may include one or more servers 962. Each server 962 may be a unitary server or a distributed server spanning multiple computers or multiple datacenters. Servers 962 may be of various types, such as, for example and without limitation, web server, news server, mail server, message server, advertising server, file server, application server, exchange server, database server, proxy server, another server suitable for performing functions or processes described herein, or any combination thereof. In particular exemplary embodiments, each server 962 may include hardware, software, or embedded logic components or a combination of two or more such components for carrying out the appropriate functionalities implemented and/or supported by server 962. In particular exemplary embodiments, network device 960 may include one or more data stores 964. Data stores 964 may be used to store various types of information. In particular exemplary embodiments, the information stored in data stores 964 may be organized according to specific data structures. In particular exemplary embodiments, each data store 964 may be a relational, columnar, correlation, or other suitable database. Although this disclosure describes or illustrates particular types of databases, this disclosure contemplates any suitable types of databases. Particular exemplary embodiments may provide interfaces that enable communication devices 905, 910, 915, 920 and/or another system (e.g., a third-party system) to manage, retrieve, modify, add, or delete, the information stored in data store 964.

Network device 960 may provide users of the system 900 the ability to communicate and interact with other users. In particular exemplary embodiments, network device 960 may provide users with the ability to take actions on various types of items or objects, supported by network device 960. In particular exemplary embodiments, network device 960 may be capable of linking a variety of entities. As an example and not by way of limitation, network device 960 may enable users to interact with each other as well as receive content from other systems (e.g., third-party systems) or other entities, or to allow users to interact with these entities through an application programming interfaces (API) or other communication channels.

It should be pointed out that although FIG. 9 shows one network device 960 and four communication devices 905, 910, 915 and 920 any suitable number of network devices 960 and communication devices 905, 910, 915 and 920 may be part of the system of FIG. 9 without departing from the spirit and scope of the present disclosure.

Exemplary Artificial Reality System

Figure 10:
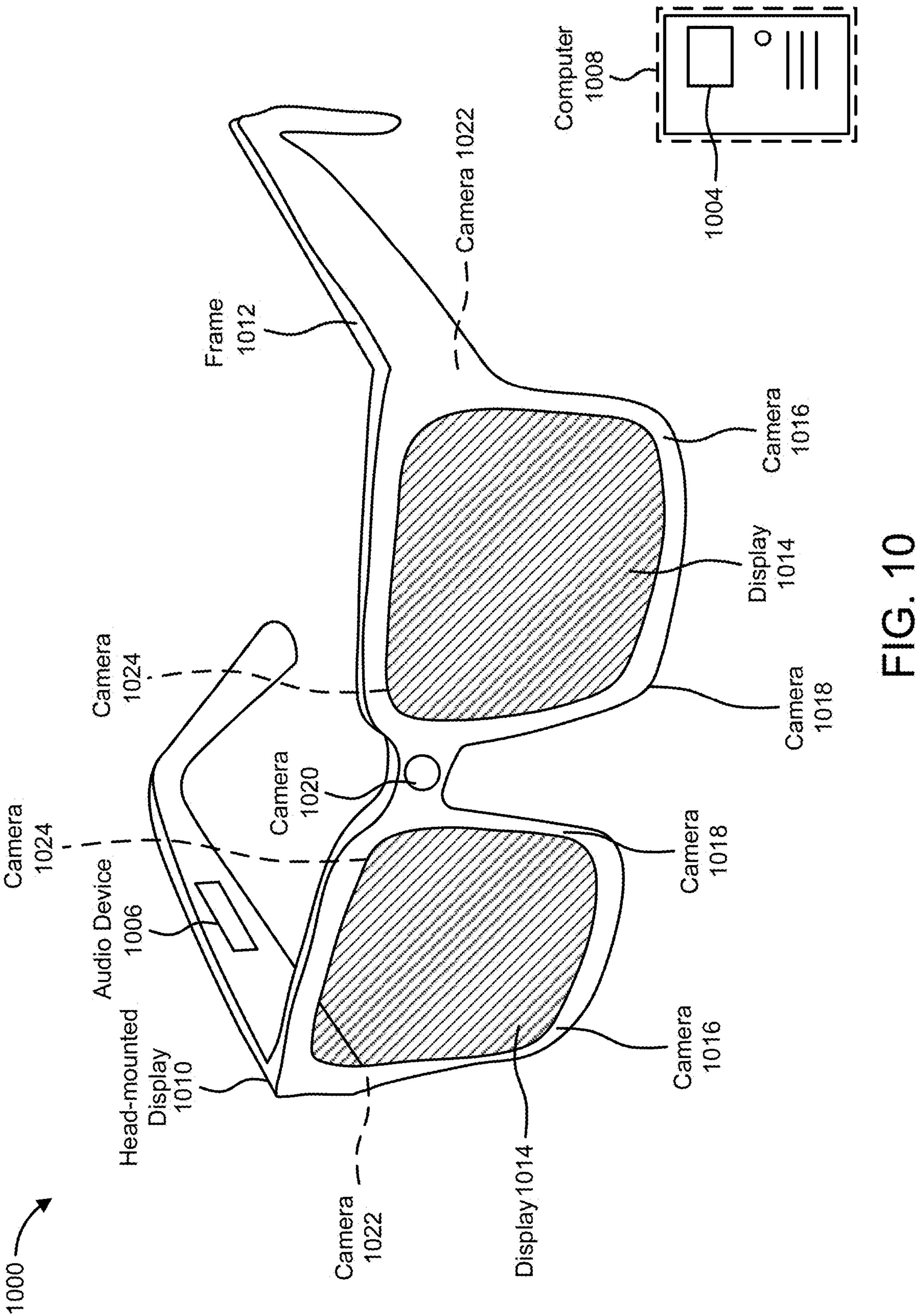
FIG. 10 illustrates an artificial reality system comprising a headset, in accordance with examples of the present disclosure.

FIG. 10 illustrates an example artificial reality system 1000. The artificial reality system 1000 (also referred to herein as artificial reality device 1000) may include a head-mounted display (HMD) 1010 (e.g., smart glasses) comprising a frame 1012, one or more displays 1014, and a computing device 1008 (also referred to herein as computer 1008). In some exemplary embodiments, the HMD 1010 may be one or more of the communication devices 905, 910, 915, 920. The displays 1014 may be transparent or translucent allowing a user wearing the HMD 1010 to look through the displays 1014 to see the real world (e.g., real world environment) and displaying visual artificial reality content to the user at the same time.

The HMD 1010 may include an audio device 1006 (e.g., speaker/microphone 38 of FIG. 11) that may provide audio artificial reality content to users. The HMD 1010 may include one or more cameras 1020 which may capture images and/or videos of environments. In one exemplary embodiment, the HMD 1010 may include one or more cameras 1016 and one or more cameras 1018 which may be rear-facing cameras tracking movement and/or gaze of a user's eyes. In an alternative exemplary embodiment, the HMD 1010 may optionally additionally include one or more cameras 1022 and/or one or more cameras 1024, which may be rear-facing cameras tracking movement and/or gaze of a user's eyes. For instance, each of the two displays 1014 (e.g., a display 1014 for a right eye and a display 1014 for a left eye) may include a camera 1016, a camera 1018, optionally a camera 1022 and optionally a camera 1024.

The camera(s) 1020 may be a forward-facing camera capturing images and/or videos of the environment that a user wearing the HMD 1010 may view. The HMD 1010 may include an eye tracking system to track the vergence movement of the eyes of the user wearing the HMD 1010. In one exemplary embodiment, the camera 1016, the camera 1018, optionally the camera 1022 and optionally the camera 1024 may be part of the eye tracking system. In some exemplary embodiments, the cameras 1016, 1018, and/or optionally the cameras 1022, 1024, may be cameras configured to view at least one eye of a user to capture a glint image(s).

In some other exemplary embodiments, the HMD 1010 may include additional cameras 1016, 1018, 1022 and 1024 to facilitate viewing of each of the eyes of a user to enhance the capture of a glint image(s). The HMD 1010 may include a microphone of the audio device 1006 to capture voice input from the user. The artificial reality system 1000 may further include a controller 1004 (e.g., processor 32 of FIG. 11) comprising a trackpad and one or more buttons. The controller may receive inputs from users and relay the inputs to the computing device 1008. The controller may also provide haptic feedback to one or more users. The computing device 1008 may be connected to the HMD 1010 and the controller through cables or wireless connections. The computing device 1008 may control the HMD 1010 and the controller to provide the augmented reality content to and receive inputs from one or more users. In some example embodiments, the controller (e.g., processor 32 of FIG. 11) may be a standalone controller or integrated within the HMD 1010. The computing device 1008 may be a standalone host computer device, an on-board computer device integrated with the HMD 1010, a mobile device, or any other hardware platform capable of providing artificial reality content to and receiving inputs from users. In some exemplary embodiments, HMD 1010 may include an augmented reality system/virtual reality system/mixed reality system.

Exemplary Communication Device

Figure 11:
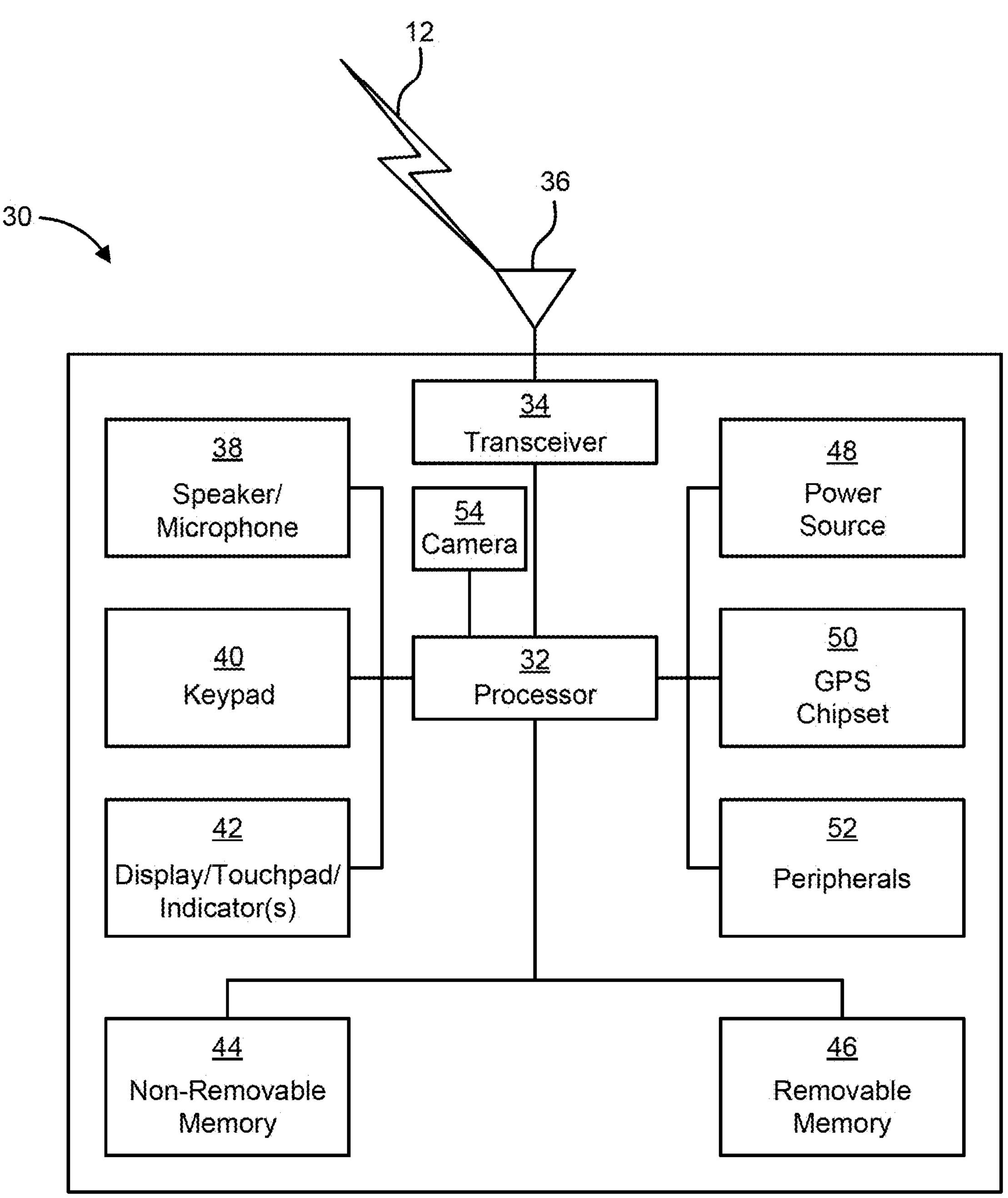
FIG. 11 is a diagram of an exemplary communication device in accordance with an example of the present disclosure.

FIG. 11 illustrates a block diagram of an exemplary hardware/software architecture of a communication device such as, for example, user equipment (UE) 30. In some exemplary embodiments, the UE 30 may be any of communication devices 905, 910, 915, 920. In some exemplary embodiments, the UE 30 may be a computer system such as for example smart glasses, an augmented/virtual reality device, a desktop computer, notebook or laptop computer, netbook, a tablet computer (e.g., a smart tablet), e-book reader, GPS device, camera, personal digital assistant, handheld electronic device, cellular telephone, smartphone, smart watch, charging case, or any other suitable electronic device. As shown in FIG. 11, the UE 30 (also referred to herein as node 30) may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The power source 48 may be capable of receiving electric power for supplying electric power to the UE 30. For example, the power source 48 may include an alternating current to direct current (AC-to-DC) converter allowing the power source 48 to be connected/plugged to an AC electrical receptable and/or Universal Serial Bus (USB) port for receiving electric power. The UE 30 may also include one or more cameras 54. In an exemplary embodiment, the camera(s) 54 may be a smart camera configured to sense images/video appearing within one or more bounding boxes. The UE 30 may also include communication circuitry, such as a transceiver 34 and a transmit/receive element 36. It will be appreciated the UE 30 may include any sub-combination of the foregoing elements while remaining consistent with an embodiment.

The processor 32 may be a special purpose processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node 30 in order to perform the various required functions of the node. For example, the processor 32 may perform signal coding, data processing, power control, input/output processing, and/or any other functionality that enables the node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

The processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected.

The transmit/receive element 36 may be configured to transmit signals to, or receive signals from, other nodes or networking equipment. For example, in an exemplary embodiment, the transmit/receive element 36 may be an antenna configured to transmit and/or receive radio frequency (RF) signals. The transmit/receive element 36 may support various networks and air interfaces, such as wireless local area network (WLAN), wireless personal area network (WPAN), cellular, and the like. In yet another exemplary embodiment, the transmit/receive element 36 may be configured to transmit and/or receive both RF and light signals. It will be appreciated that the transmit/receive element 36 may be configured to transmit and/or receive any combination of wireless or wired signals. The transmit/receive element 36 may also be configured to connect the UE 30 to an external communications network, such as network 12, to enable the UE 30 to communicate with other nodes (e.g., other UEs 30, network device 960, etc.) of the network.

The transceiver 34 may be configured to modulate the signals that are to be transmitted by the transmit/receive element 36 and to demodulate the signals that are received by the transmit/receive element 36. As noted above, the node 30 may have multi-mode capabilities. Thus, the transceiver 34 may include multiple transceivers for enabling the node 30 to communicate via multiple radio access technologies (RATs), such as universal terrestrial radio access (UTRA) and Institute of Electrical and Electronics Engineers (IEEE 802.11), for example.

The processor 32 may access information from, and store data in, any type of suitable memory, such as the non-removable memory 44 and/or the removable memory 46. For example, the processor 32 may store session context in its memory, as described above. The non-removable memory 44 may include RAM, ROM, a hard disk, or any other type of memory storage device. The removable memory 46 may include a subscriber identity module (SIM) card, a memory stick, a secure digital (SD) memory card, and the like. In other exemplary embodiments, the processor 32 may access information from, and store data in, memory that is not physically located on the node 30, such as on a server or a home computer.

The processor 32 may receive power from the power source 48, and may be configured to distribute and/or control the power to the other components in the node 30. The power source 48 may be any suitable device for powering the node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like. The processor 32 may also be coupled to the GPS chipset 50, which may be configured to provide location information (e.g., longitude and latitude) regarding the current location of the node 30. It will be appreciated that the node 30 may acquire location information byway of any suitable location-determination method while remaining consistent with an exemplary embodiment.

Exemplary System Operation

The examples of the present disclosure may provide a flexible structure including multiple LEDs that may be mounted around a lens or around a frame, of smart glasses (e.g., artificial reality system 1000), as illumination sources. The LEDs may be arranged in a uniform manner along a lens or a frame of the smart glasses to improve the illumination brightness and uniformity of light coverage on an eye(s) of a user.

The light illuminated/generated by the LEDs may be reflected from an eye(s) of a user and the reflected light (e.g., a glint(s)) of the eye(s) may be captured, as an image(s) (e.g., a glint image(s), a pupil image(s)), by one or more cameras. The cameras may, for example, be direct view cameras. In one exemplary embodiment, the cameras may be cameras 1016, 1018. In another exemplary embodiment, the cameras may be cameras 1016, 1018, 1022, 1024. In an alternative exemplary embodiment, the cameras of the smart glasses may include any suitable quantity of cameras 1016, 1018, 1022, 1024. The location and orientation of the one or more cameras may be important for the efficiency of light reflected (e.g., the glint(s)) from the eye(s) based on a determined gaze angle as well as accuracy of predicting the pupil location and gaze angle of the eye. The one or more cameras may process data associated with the glint(s) to determine pupil location, gaze angle/gaze direction, and/or a gaze of the eye(s). The one or more cameras may be arranged in the frame of the smart glasses.

In an example of the present disclosure, the direct view cameras may operate at a wavelength range between 800 nanometers (nm) to 1,000 nm with a 50% cut-off. In some examples, the 50% cutoff may denote that the wavelength is between the 800 nm to 1,000 nm range and the power of the direct view cameras may be at 50%. In this regard, the direct view cameras may, for example, be at 50% power (e.g., 50% of the optical power) at either end of the range (e.g., a 800 nm to 1,000 nm range) In other examples, the direct view cameras may operate at other wavelength ranges with one or more other cut-offs. Additionally, for purposes of illustration and not of limitation, a length and a width of the cameras may be less than 3 millimeters (mm)×3 mm. Further, for purposes of illustration and not of limitation, a field of depth of the cameras, for example, may be between 10 mm and 60 mm and the cameras may have a diagonal field of view greater than 60°. Also, for purposes of illustration and not of limitation, the cameras, for example, may have a resolution greater than 1 pixel per mm at an object plane. In other examples, the length and width of the cameras and the field of depth of the cameras may be associated with other values.

Additionally, the diagonal FOV of the cameras may be associated with other angles and the cameras may have other resolutions at the object plane. A frame (e.g., frame 1012) of smart glasses may have a tapering on an edge to enable the placement of one or more of the cameras at an angle, for example, in a range of 10° to 80°. In some other examples, the frame (e.g., frame 1012) of smart glasses may have a tapering on an edge to enable the placement of one or more of the cameras at an angle, for example, in a range of 0° to 90° or any other suitable angles in other ranges. In another example, the LEDs that may be on a flexible circuit may be side-emitting (e.g., infrared (IR) light is emitted out of a side of the LEDs without a need to tilt the LEDs). In another example, the LEDs on the flexible circuit may be behind a prescription (Rx) lens.

Figure 12A:
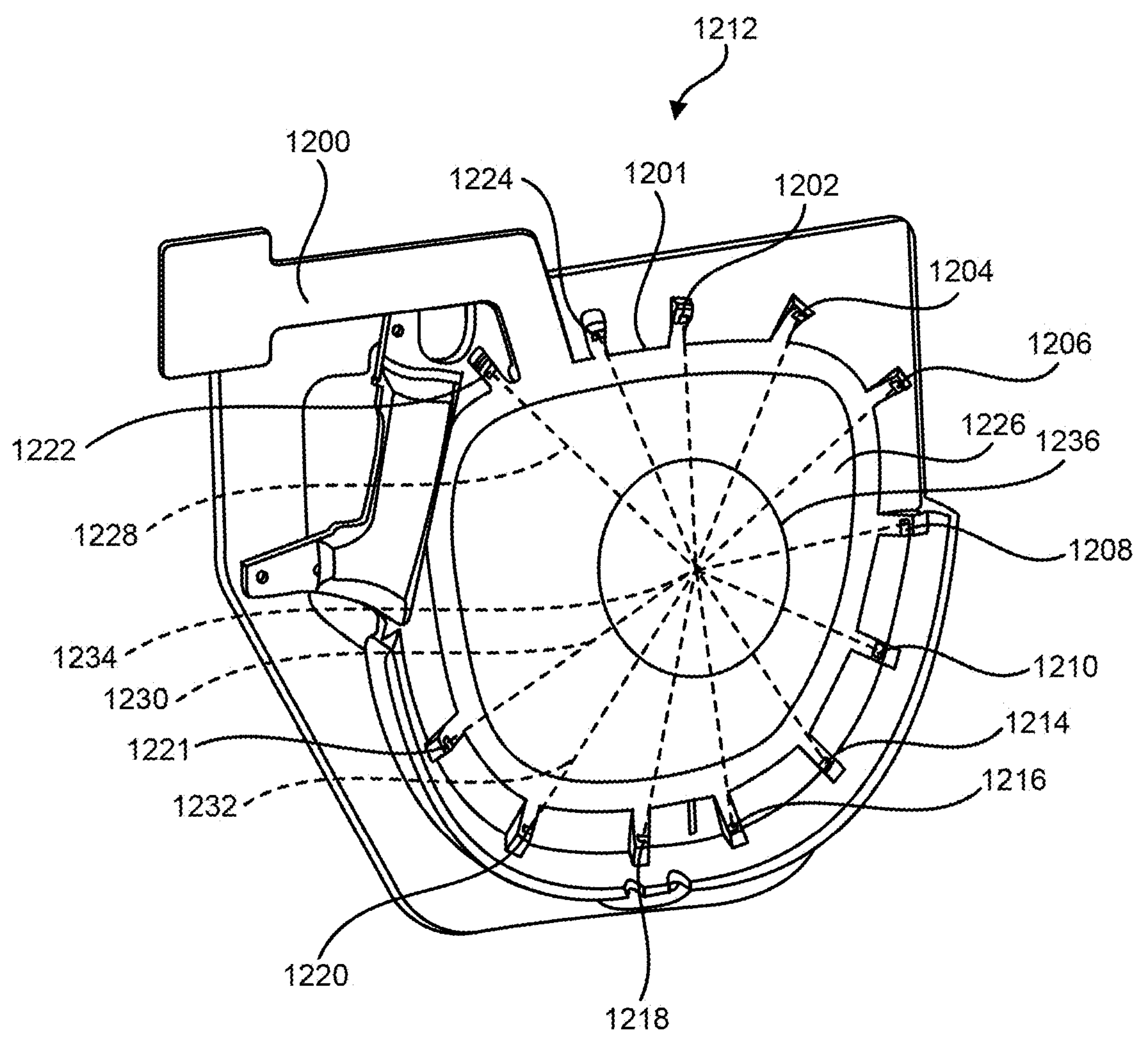
FIG. 12A is a diagram illustrating a frame of smart glasses including LEDs mounted around a lens or the frame in accordance with an example of the present disclosure.

Referring now to FIG. 12A, a diagram illustrating a frame of smart glasses including LEDs, mounted around a lens or the frame, as illumination sources is provided according to an exemplary embodiment. In the exemplary embodiment of FIG. 12A, the frame 1212 may include a flexible printed circuit board 1200 (also referred to herein as flexible circuit board 1200) having wires (e.g., the plurality of wires 1402 of FIG. 14) (also referred to herein as traces) connected to the LEDs. In an example embodiment, the frame 1212 may be a portion (e.g., a right eye frame portion, etc.) of an overall/complete frame (e.g., frame 1012) of smart glasses. The LEDs of FIG. 12A may, for example, be near-infrared LEDs, which may emit near-infrared (NIR) light having a NIR wavelength range. In some examples, the NIR wavelength range may be 800 nm to 1,000 nm. The LEDs may have a radiant flux equal to or greater than 1 milliwatts (mW)/steradian (sr) radiant intensity and may have an emission cone equal to or greater than a 10° half-angle. In other examples, the NIR wavelength range may be a wavelength range other than 800 nm to 1,000 nm (e.g., 800 nm to 950 nm, etc.). Additionally in other examples, the LEDs may have another radiant flux and may have other emission cones associated with other half-angles (e.g., equal to or greater than a 50° half-angle, etc.).

In the example embodiment of FIG. 12A, the flexible circuit board 1200 may be connected to LEDs 1202, 1204, 1206, 1208, 1210, 1214, 1216, 1218, 1220, 1221, 1222 and 1224, mounted around a lens 1226, as illumination sources. Each of the LEDs may be configured to illuminate/emit one or more rays of light (e.g., light rays 1228, 1230, 1232, etc.). Although FIG. 12A illustrates 12 LEDs, it should be pointed out that any suitable quantity of LEDs (e.g., less than 12 LEDs, more than 12 LEDs, etc.) may be mounted around the lens 1226. In an example embodiment, the LEDs 1202,

1204, 1206, 1208, 1210, 1214, 1216, 1218, 1220, 1221, 1222, 1224 may each have individually addressed electrically conductive wires or traces (e.g., the plurality of wires 1402) embedded within the flexible circuit board 1200. In another example, the LEDs may have a combination of electrically in-series and parallel connections to save a total number of conductive wires or traces to reduce the size or width of the flexible circuit.

The flexible circuit board 1200 may have a shape such as an eye-shape ring 1201 to accommodate the lens (e.g., 1226) or frame (e.g., frame 1212) shape of smart glasses (e.g., artificial reality system 1000). The LEDs 1202, 1204, 1206, 1208, 1210, 1214, 1216, 1218, 1220, 1221, 1222, 1224 may be extended to enable mechanically mounting on the frame of the smart glasses with an illumination surface of the LEDs 1202, 1204, 1206, 1208, 1210, 1214, 1216, 1218, 1220, 1221, 1222, 1224 having a perpendicular direction pointing at a center (e.g., center 1234) of rotation of an eyeball (e.g., eyeball 1236) of a user. The user may be wearing the smart glasses. The lens 1226, for example, may be comprised of glass. In some examples, the lens 1226 may be configured to include an eyesight prescription (e.g., a prescription for myopia, hypermetropia or other eye conditions) for an eye(s) of a user. In an example embodiment, the LEDs 1202, 1204, 1206, 1208, 1210, 1214, 1216, 1218, 1220, 1221, 1222, 1224 may be arranged in a uniform manner along the lens (e.g., lens 1226) or frame (e.g., frame 1212) of the smart glasses to improve the illumination brightness and uniformity of light coverage on an eye(s) of a user.

The light illuminated/generated by the LEDs 1202, 1204, 1206, 1208, 1210, 1214, 1216, 1218, 1220, 1221, 1222, 1224 may be reflected from an eye(s) (e.g., eyeball 1236) of a user and the reflected light (e.g., a glint(s)) of the eye(s) may be captured by one or more cameras (e.g., cameras 1016, 1018, 1022, 1024). Additionally, in some examples, the location and/or orientation of the one or more cameras may be beneficial for the efficiency of light reflected (e.g., the glint(s)) from the eye(s) based on a determined gaze angle. A controller (e.g., controller 1004) of the one or more cameras may process data associated with the glint(s) to determine pupil location, gaze angle and/or a gaze direction of the eye(s).

In an example embodiment, the one or more cameras may be arranged in the frame of the smart glasses, as described more fully below. Based in part on the LEDs 1202, 1204, 1206, 1208, 1210, 1214, 1216, 1218, 1220, 1221, 1222, 1224 being arranged in a uniform manner along the lens (e.g., lens 1226) or frame (e.g., frame 1212) of the smart glasses to improve the illumination brightness and uniformity of light coverage on an eye(s) of a user and based on the location/orientation of the one or more cameras, the exemplary embodiments may more accurately determine a gaze of a user's eye(s) than some existing approaches/systems. In this regard, the exemplary embodiments may minimize gaze error. For example, based on utilizing the LEDs around the lens of the frame to illuminate light, the exemplary embodiments may minimize gaze error in a manner that some existing approaches/existing systems are unable to achieve. For example, based on utilizing the LEDs around the lens of the frame to illuminate light, the exemplary embodiments may enable eye tracking performance within all possible gaze angles and eye positions relative to the frame locations (e.g., due to the location movement or shift of the frame during normal wear (e.g., wear of smart glasses)).

Figure 12B:
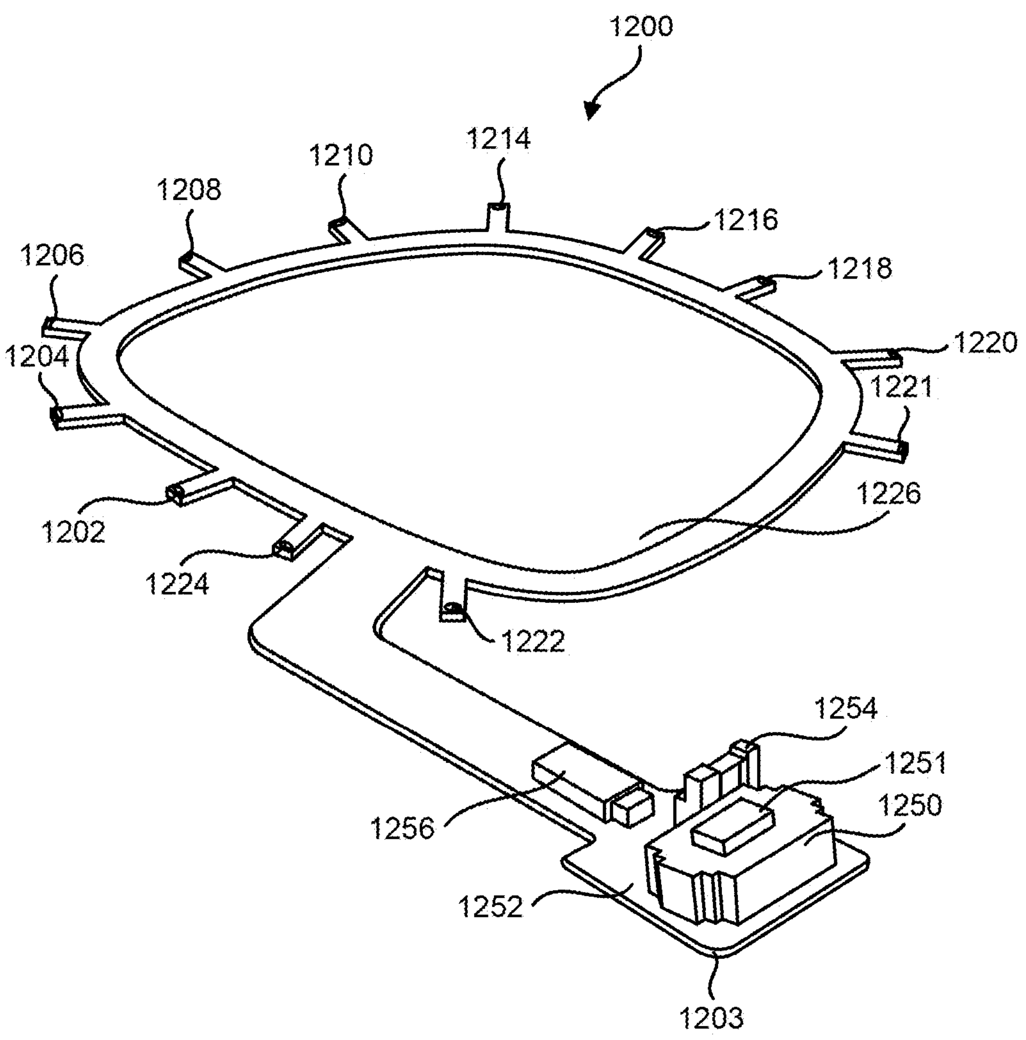
FIG. 12B is a diagram illustrating a flexible circuit board in accordance with an example of the present disclosure.

Referring now to FIG. 12B, a diagram illustrating a flexible circuit board according to an example of the present disclosure is provided. The flexible circuit board 1200 of FIG. 12B may include conductive wires (e.g., the plurality of wires 1402) that may connect to the LEDs 1202, 1204, 1206, 1208, 1210, 1214, 1216, 1218, 1220, 1221, 1222, 1224. Additionally, the conductive wires of the flexible circuit board 1200 may connect to a controller 1251 (also referred to herein as an electronics board driver 1251). For example, the conductive wires of the flexible circuit board 1200 may connect to a multiple pin connector 1250 which may connect to the controller via a printed circuit board assembly (PCBA) 1252 of the flexible circuit board 1200. The flexible circuit board 1200 may include a memory device 1256 (also referred to herein as memory chip 1256). In some examples, the memory device 1256 may be analyzed/read by the controller 1251 to determine features such as, for example, calibration state, and other parameters that convey the power that may be applied to the LEDs.

The flexible circuit board 1200 may also include an electrically erasable programmable read-only memory (EEPROM) 1254 that may be arranged/located at an end 1203 of the flexible circuit board 1200. The EEPROM 1254 may be configured to set/limit (e.g., predefined/predetermined settings/limits) a current maximum, a voltage maximum and/or a power maximum of the LEDs 1202, 1204, 1206, 1208, 1210, 1214, 1216, 1218, 1220, 1221, 1222, 1224 for eye-safety functions and/or circuit protection functions of the LEDs in an instance in which the LEDs 1202, 1204, 1206, 1208, 1210, 1214, 1216, 1218, 1220, 1221, 1222, 1224 are driven/controlled by the controller 1251.

For safety, the controller 1251 may control/regulate, via the EEPROM 1254, the current, voltage and/or power to the LEDs 1202, 1204, 1206, 1208, 1210, 1214, 1216, 1218, 1220, 1221, 1222, 1224 to enhance eye-safety protection and/or circuit protection of the LEDs. For example, the controller 1251 may control each of the LEDs 1202, 1204, 1206, 1208, 1210, 1214, 1216, 1218, 1220, 1221, 1222, 1224 to illuminate light uniformly within eye safety limits. The controller 1251 may automatically turn off power to the LEDs 1202, 1204, 1206, 1208, 1210, 1214, 1216, 1218, 1220, 1221, 1222, 1224 in an instance in which the controller 1251 may detect a short circuit or broke circuit, or other malfunction associated with a wire(s) (e.g., the plurality of wires 1402) or a LED(s) to ensure eye safety.

Additionally, by the controller 1251 controlling/regulating the power of the LEDs 1202, 1204, 1206, 1208, 1210, 1214, 1216, 1218, 1220, 1221, 1222, 1224 based on the predetermined settings/limits of the EEPROM 1254, the controller 1251 may enable the LEDs 1202, 1204, 1206, 1208, 1210, 1214, 1216, 1218, 1220, 1221, 1222, 1224 of the around the lens (e.g., lens 1226) eye tracking system to operate with low power (e.g., less than 20 mW) and as such the LEDs 1202, 1204, 1206, 1208, 1210, 1214, 1216, 1218, 1220, 1221, 1222, 1224 may conserve more power than existing eye tracking approaches/existing systems. In some examples, the controller 1251 may be an integrated circuit or an IC chip (e.g., a semiconductor chip). Additionally, unlike some existing eye tracking approaches/existing systems, the around the lens (e.g., lens 1226) eye tracking system(s) of the examples of the present disclosure, may facilitate covering the eye tracking performance in all possible gaze angles and frame locations relative to the eyeball(s) of an eye.

The controller 1251 may trigger/cause the illumination of light (e.g., light rays 1228, 1230, 1232, etc.) by the LEDs 1202, 1204, 1206, 1208, 1210, 1214, 1216, 1218, 1220, 1221, 1222, 1224 to be emitted periodically. The direct view cameras (e.g., camera 1016, camera 1018, camera 1022, camera 1024) may be synchronized with the controller 1251 in an instance in which the controller may trigger/cause the periodic emission of the light from the LEDs 1202, 1204, 1206, 1208, 1210, 1214, 1216, 1218, 1220, 1221, 1222, 1224. In this regard, the direct view cameras may be synchronized with the controller 1251 to capture a glint image(s) and/or an image(s) of a pupil(s) based on the reflection(s) of the emitted light from the eye(s) of a user (e.g., a user wearing smart glasses).

Figure 12C:
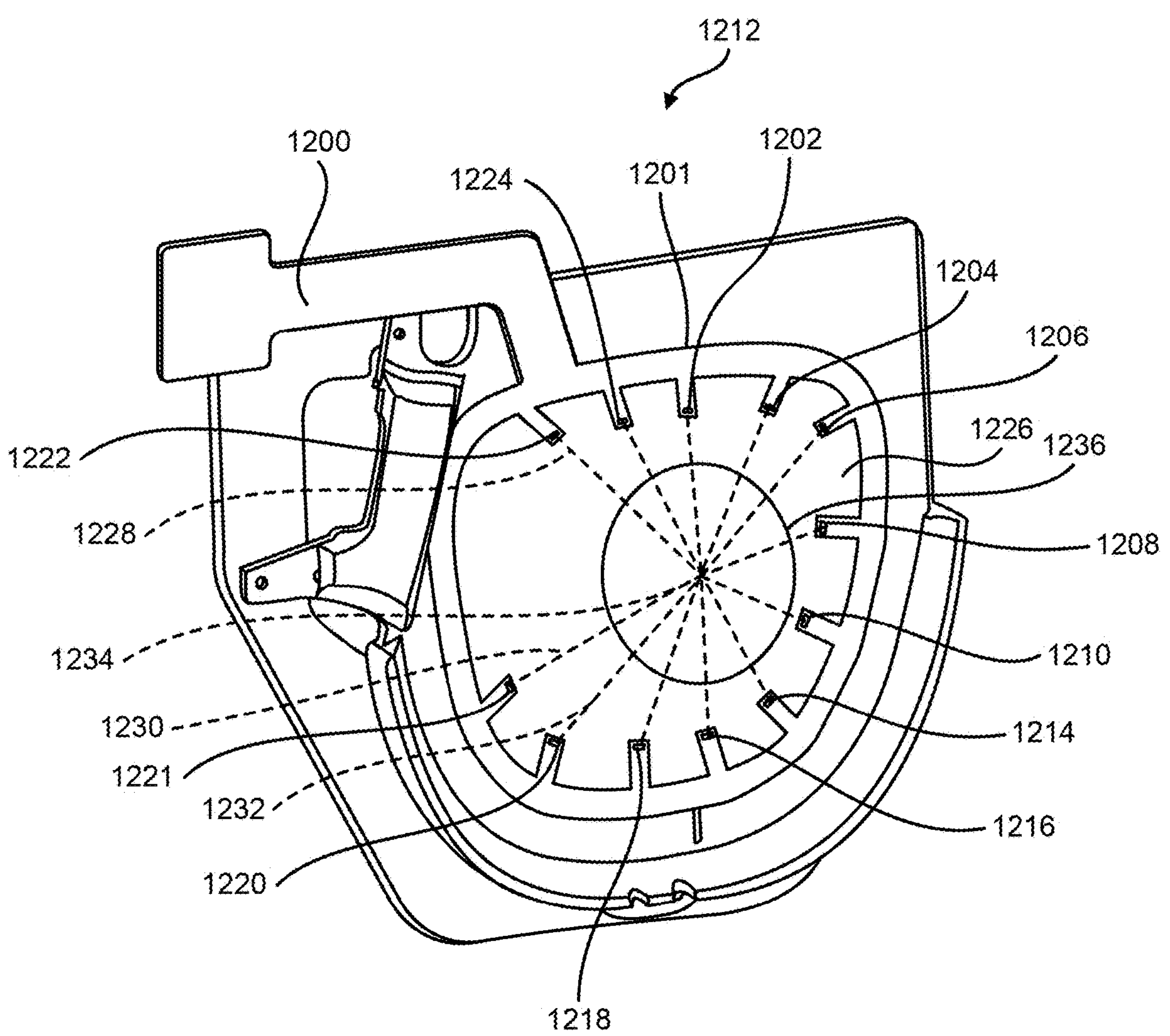
FIG. 12C is a diagram illustrating a frame of smart glasses including LEDs positioned inwards of the frame, behind the lens, in which the LEDs emit inwards in accordance with an example of the present disclosure.

Referring now to FIG. 12C, a diagram illustrating a frame of smart glasses including LEDs positioned inwards of the frame, behind the lens, in which the LEDs emit inwards according to an example of the present disclosure is provided. In the example of FIG. 12C, the LEDs 1202, 1204, 1206, 1208, 1210, 1214, 1216, 1218, 1220, 1221, 1222, 1224 may be positioned inwards of the frame 1212 behind the lens 1226. The LEDs 1202, 1204, 1206, 1208, 1210, 1214, 1216, 1218, 1220, 1221, 1222, 1224 may be within the eye-shape ring 1201 of the frame 1212 and emitting inward (e.g., towards eyeball 1236) and may thereby reduce the conspicuity associated with the emission of the LEDs. The LEDs 1202, 1204, 1206, 1208, 1210, 1214, 1216, 1218, 1220, 1221, 1222, 1224 may be arranged at corresponding angles, behind the lens 1226, embodied in the frame 1212 (e.g., of smart glasses).

Figure 12D:
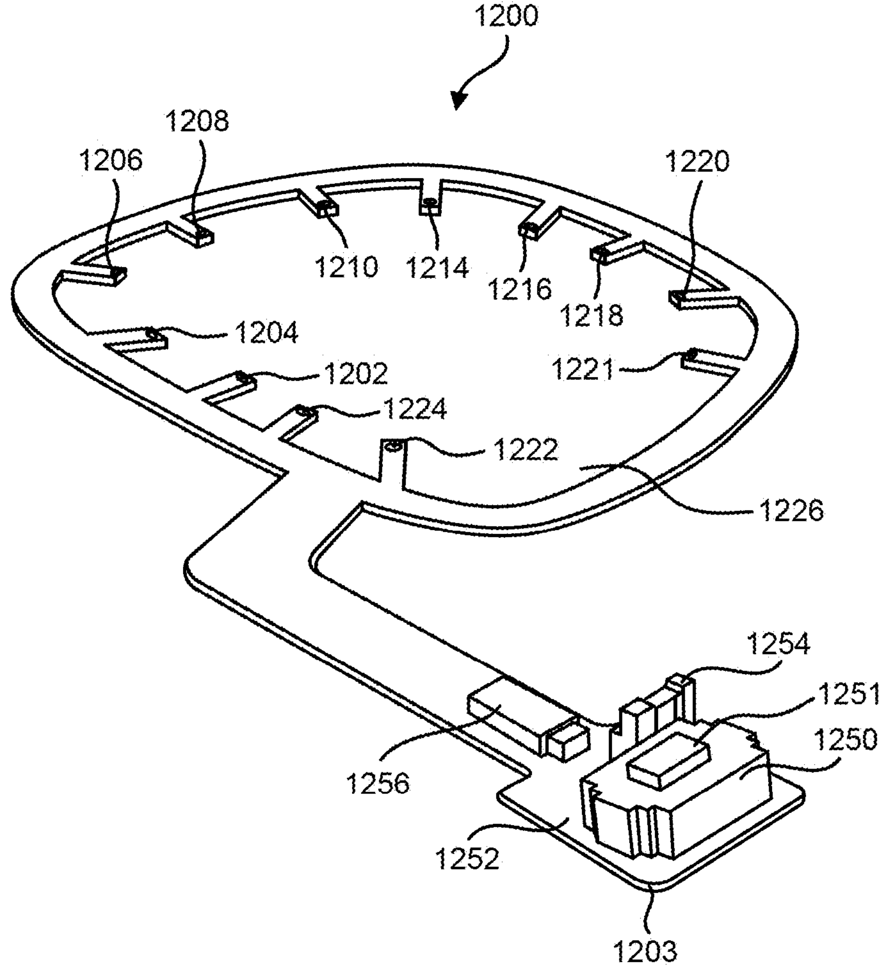
FIG. 12D is a diagram illustrating a flexible circuit board associated with a frame of smart glasses including LEDs positioned inwards behind the lens associated with the frame, in accordance with an example of the present disclosure.

Referring now to FIG. 12D, a diagram illustrating a flexible circuit board associated with a frame of smart glasses including LEDs positioned inwards behind the lens associated with the frame, according to an example of the present disclosure is provided. In the example of FIG. 12D, the LEDs 1202, 1204, 1206, 1208, 1210, 1214, 1216, 1218, 1220, 1221, 1222, 1224 may be positioned inwards behind the lens 1226 associated with the flexible circuit board 1200.

Figure 13:
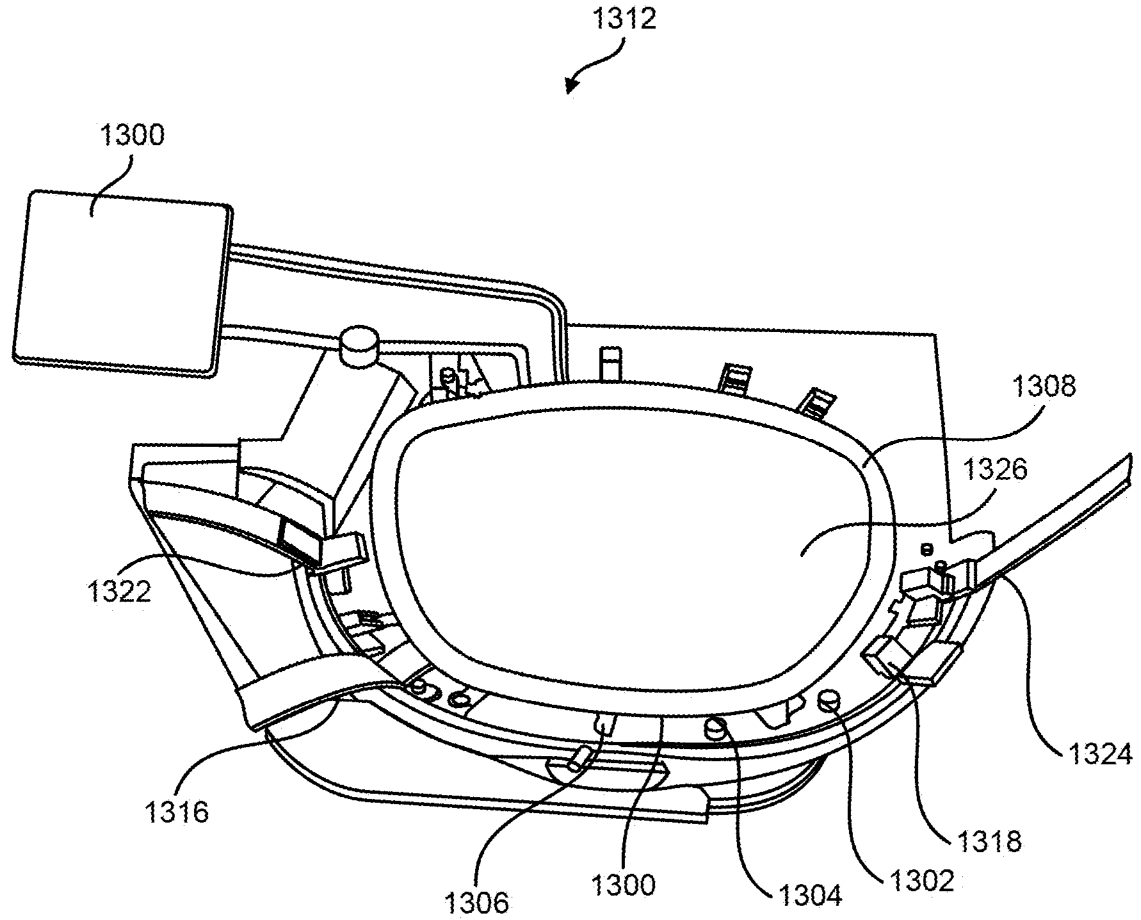
FIG. 13 is a diagram illustrating another frame of smart glasses including LEDs, mounted around a lens or the frame, as illumination sources in accordance with an example of the present disclosure.

Referring now to FIG. 13, a diagram illustrating another frame of smart glasses including LEDs, mounted around a lens or the frame, as illumination sources is provided according to an exemplary embodiment. The example of FIG. 13 may include a flexible circuit board 1300 which may also have a shape such as, for example, an eye-shape ring 1301 to accommodate the lens (e.g., 1326) or frame (e.g., frame 1312) shape of smart glasses (e.g., artificial reality system 1000). Additionally, the example of FIG. 13 may include a cluster of LEDs (e.g., LED 1302, LED 1304, LED 1306, LED 1308, etc.) arranged/located around the lens 1326 (e.g., lens 1226) or frame 1312 (e.g., frame 1212). The frame 1312 may be a portion of an overall/complete frame (e.g., frame 1012) of smart glasses (e.g., artificial reality system 1000). The frame 1312 may include direct view cameras 1316, 1318, 1322, and 1324. Although 4 direct view cameras 1316, 1318, 1322, and 1324 are shown in FIG. 13, for purposes of illustration and not of limitation, any suitable quantity (e.g., less than 4 cameras (e.g., 2 cameras), more than 4 cameras, etc.) of direct view cameras may be included in the frame 1312 of the smart glasses.

Additionally, although 4 LEDs 1302, 1304, 1306, 1308 are shown in FIG. 13, for purposes of illustration and not of limitation, any suitable quantity (e.g., less than 4 LEDs, more than 4 LEDs, 12 LEDs, etc.) of LEDs may be included in the frame 1312 of the smart glasses. The frame 1312 may also include a flexible circuit board 1300 (e.g., flexible circuit board 1200). The flexible circuit board 1300 may also include an EEPROM (e.g., EEPROM 1254) and a connector (e.g., multiple pin connector 1250). The connector may connect the flexible circuit board 1300, having wires connected to the LEDs, to a controller (e.g., controller 1251). The LEDs (e.g., LEDs 1302, 1304, 1306, 1308) may be directed to point to a center of an eyeball such that in an instance in which the LEDs are controlled by a controller to turn on (e.g., power on), the LEDs may periodically emit/illuminate light (e.g., NIR light). In this regard, the illuminated light emitted by the LEDs may be directed to a center of an eyeball (e.g., eyeball 1236).

The illuminated light generated by the LEDs (e.g., LEDs 1302, 1304, 1306, 1308) may be reflected from the eyeball of a user and the reflected light (e.g., a glint(s), a pupil image(s)) of the eyeball may be captured as one or more images (e.g., glint images, a pupil image(s)) by the camera 1316 (e.g., camera 1016), the camera 1318 (e.g., camera 1018), the camera 1322 (e.g., camera 1022), and/or the camera 1324 (e.g., camera 1024). The location and/or orientation of the one or more cameras 1316, 1318, 1322, 1324 may be beneficial for the efficiency of light reflected (e.g., the glint(s), the pupil image(s)) from the eyeball based on a determined gaze angle (e.g., camera location may affect the eye tracking system performance such as eyelash occlusion and/or pupil/gaze angle prediction accuracy). For example, based on the location placement of the cameras in the frame 1312 along the lens 1326, the cameras 1316, 1318, 1322, 1324 may be configured to capture images, at various angles, of the reflections of the eyeball, and as such may completely capture the eyeball in images. In one exemplary embodiment, for example, the frame 1312 may be tapered on an edge to enable placement of one or more of the cameras 1316, 1318, 1322, 1324 at an angle in the range of 10° to 80°. A controller (e.g., controller 1004) of the cameras 1316, 1318, 1322, 1324 may process data associated with the glint(s), or pupil image(s) to determine pupil location, gaze angle and/or a gaze direction of the eyeball.

Figure 14:
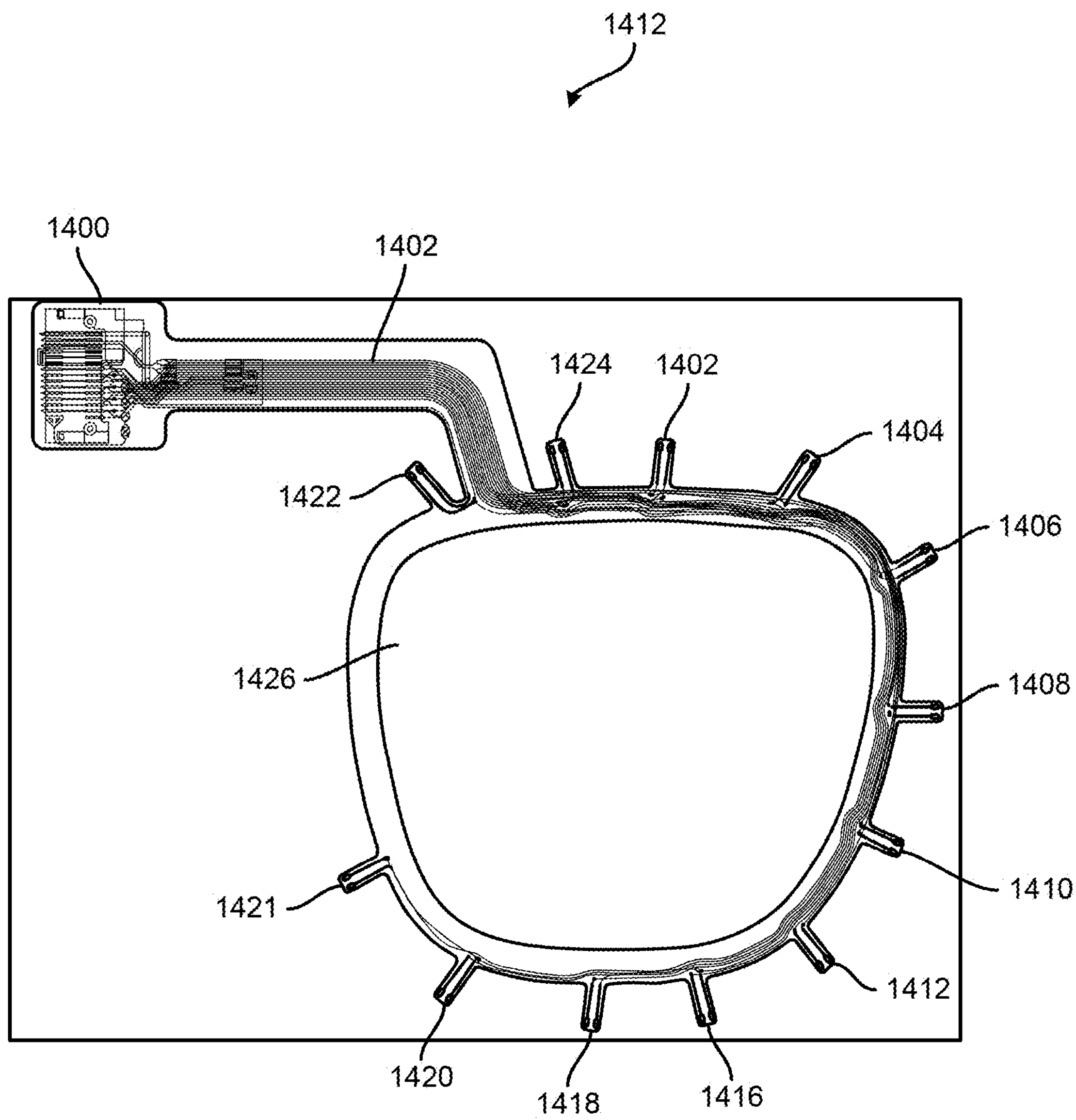
FIG. 14 is another diagram illustrating yet another frame of smart glasses including LEDs, mounted around a lens or the frame, as illumination sources in accordance with an example of the present disclosure.

Referring now to FIG. 14, a diagram illustrating another frame of smart glasses including LEDs, mounted around a lens or the frame, as illumination sources is provided according to an exemplary embodiment. The example embodiment of FIG. 14 may include a cluster of LEDs (e.g., LED 1402, LED 1404, LED 1406, LED 1408, LED 1410, LED 1414, LED 1416, LED 1418, LED 1420, LED 1421, LED 1422, LED 1424) arranged/located around the lens 1426 (e.g., lens 1426) or frame 1412 (e.g., frame 1412). The frame 1412 may be a portion of an overall/complete frame (e.g., frame 1012) of smart glasses (e.g., artificial reality system 1000).

FIG. 14 illustrates that the flexible circuit board 1400 (e.g., flexible circuit board 1200, flexible circuit board 1300) includes a plurality of wires 1402 (e.g., traces) connecting to the LEDs. The plurality of wires 1402 may also connect to a connector (e.g., multiple pin connector 1250) of the flexible circuit board 1400 to enable the flexible circuit board 1400 to connect to a controller. The controller (e.g., controller 1251) may be configured to control or regulate the current, voltage, and/or power to the LEDs and may perform eye safety protection functions and/or circuit protection functions of the LEDs, as described above. The controller (e.g., controller 1251) may also electrically control the LEDs separately to compensate for a performance variation due to a temperature variation associated with the LEDs.

Figure 15:
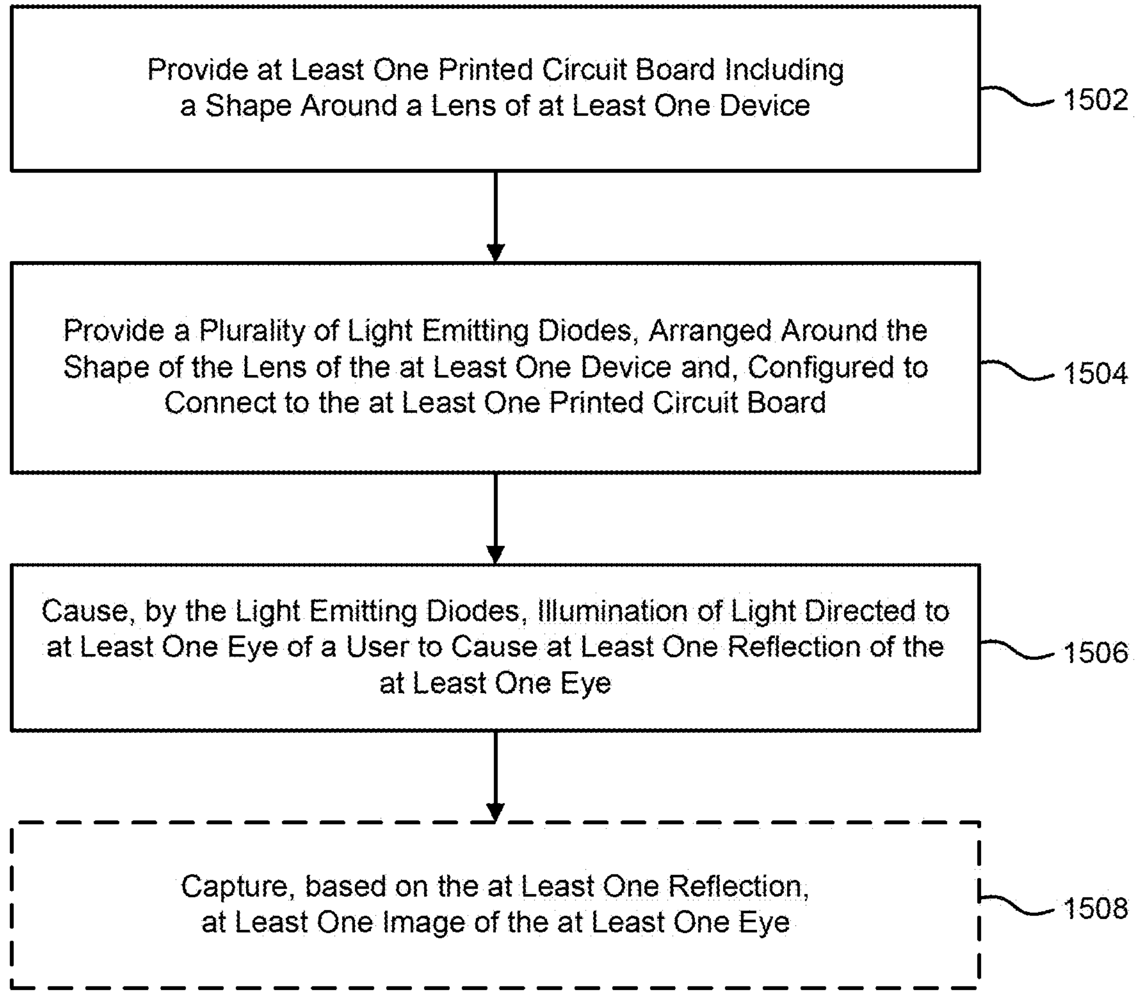
FIG. 15 illustrates an operation of an exemplary process in accordance with examples of the present disclosure.

FIG. 15 illustrates an example flowchart illustrating operations for an eye tracking system according to an exemplary embodiment. At operation 1502, a device (e.g., artificial reality device 1000) may be provided with at least one printed circuit board (e.g., flexible circuit board 1200) including a shape around a lens (e.g., lens 1226) of the device. The shape may be an eye-shape ring. At operation 1504, a device (e.g., artificial reality device 1000) may be provided with a plurality of light emitting diodes (e.g., LEDs 1202, 1204, 1206, 1208, 1210, 1214, 1216, 1218, 1220, 1221, 1222 and 1224) arranged around the shape of the lens of the device. The light emitting diodes may be configured to connect to the printed circuit board. The light emitting diodes may connect to the printed circuit board via wires/traces (e.g., a plurality of wires 1402). The wires may be embedded in the printed circuit board.

At operation 1506, a device (e.g., artificial reality device 1000) may cause, by the light emitting diodes, illumination of light directed to at least one eye of a user to cause at least one reflection of the at least one eye. The light may be near-infrared light. Optionally, at operation 1508, a device (e.g., artificial reality device 1000) may capture, based on the at least one reflection, one or more images of the at least one eye. The one or more images may be a glint image(s) (e.g., an image(s) of the reflection of the eye(s)) or an image(s) of a pupil(s). One or more cameras (e.g., cameras 1016, 1018, 1022, 1024) may capture the glint image(s) and/or the image(s) of the pupil(s). The one or more cameras may be arranged at corresponding angles, around the lens (e.g., lens 1226, lens 1326, display 1014), embodied in a frame (e.g., frame 1212, frame 1012) of the device. In some other examples, the one or more cameras (e.g., cameras 1016, 1018, 1022, 1024) may be arranged at corresponding angles, behind a lens (e.g., lens 1226, lens 1326, display 1014), embodied in a frame (e.g., frame 1212, frame 1012) of the device. The device may include a memory (e.g., EEPROM 1254) connected to the printed circuit board (e.g., flexible circuit board 1200). The memory may include one or more predetermined settings associated with a maximum of power, a maximum of voltage, or a maximum of current controlled/regulated by a controller (e.g., controller 1251) to comply with one or more eye safety functions. In some examples, the memory may be an electrically erasable programmable read-only memory.

Alternative Embodiments

In the foregoing description, various examples are described, including devices, systems, methods, and the like. For the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples.

The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

Although the methods and systems as described herein may be directed mainly to digital content, such as videos or interactive media, it should be appreciated that the methods and systems as described herein may be used for other types of content or scenarios as well. Other applications or uses of the methods and systems as described herein may also include social networking, marketing, content-based recommendation engines, and/or other types of knowledge or data-driven systems.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the example embodiments in terms of applications and symbolic representations of operations on information. These application(s) descriptions and representations may be commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Example embodiments also may relate to an apparatus for performing the operations herein. This apparatus may be specially constructed for the required purposes, and/or it may comprise a computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Example embodiments also may relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed:

1. A pair of smart glasses, comprising:

a frame;

one or more imaging devices coupled with the frame;

an optical stack coupled with the frame, the optical stack including:

a lens including a rigid transparent substrate for i) mechanically supporting a ring-shaped printed circuit board (PCB) and ii) controlling a perceived distance of a displayed image, the ring-shaped PCB having a plurality of extensions extending from the ring-shaped PCB, a plurality of illumination sources, wherein each of the plurality of illumination sources is coupled to a respective extension of the plurality of extensions of the ring-shaped PCB;

an optically clear adhesive (OCA) layer coupling at least a portion of the ring-shaped PCB with at least a portion of the lens; and memory including executable instructions that, when executed by one or more processors, cause the one or more processors to perform:

providing a first control signal to the ring-shaped PCB printed circuit board for illuminating the plurality of illumination sources, providing a second control signal to the one or more imaging devices for capturing image data of an eye of a user wearing an augmented-reality device; and determining, based on the image data, a gaze associated with the eye of the user wearing the augmented-reality device.

2. The pair of smart glasses of claim 1, wherein the first control signal controls one or more of a power, a voltage, and a current provided to the plurality of illumination sources.

3. The pair of smart glasses of claim 1, wherein the first control signal is configured to individually control one or more illumination sources of the plurality of illumination sources to compensate for changes in performance caused by temperature variation associated with the plurality of illumination sources.

4. The pair of smart glasses of claim 1, wherein the frame includes a tapered edge and at least one imaging device of the one or more imaging devices coupled with the tapered edge.

5. The pair of smart glasses of claim 1, wherein the image data of the eye of the user wearing the pair of smart glasses includes glint image data associated with at least one reflection of the eye caused by the illumination of the plurality of illumination sources.

6. The pair of smart glasses of claim 1, wherein the optical stack is configured to present one or more of artificial reality content and a real world environment associated with a field of view of the user wearing the pair of smart glasses.

7. The pair of smart glasses of claim 1, wherein at least one imaging device of the one or more imaging devices operates at a wavelength range between 800 nanometers (nm) to 1,000 nm with a 50% cut-off.

8. The pair of smart glasses of claim 1, wherein the plurality of extensions extend from an inner perimeter of the ring-shaped PCB or extend from an outer perimeter of the ring-shaped PCB.

9. The pair of smart glasses of claim 1, wherein each of the plurality of illumination sources is mechanically supported at a respective angle by a lens frame such that each of the plurality of illumination sources is angled towards a center of rotation of the eye of the user.

10. The pair of smart glasses of claim 1, wherein each of the plurality of illumination sources is disposed at a terminal end of each of the plurality of extensions.

11. A non-transitory computer-readable medium storing instructions that, when executed by a pair of smart glasses, cause the pair of smart glasses to perform:

providing, via one or more processors of the pair of smart glasses, a first control signal to a ring-shaped printed circuit board (PCB) for illuminating a plurality of illumination sources communicatively coupled with the ring-shaped PCB via a plurality of conductive traces, wherein the ring-shaped PCB and the plurality of illumination sources are part of an optical stack coupled with a frame of the pair of smart glasses, the optical stack including:

a first layer lens including a rigid transparent substrate for i) mechanically supporting the ring-shaped PCB and ii) controlling a perceived distance of a displayed image, the ring-shaped PCB having a plurality of extensions extending from the ring-shaped PCB, the plurality of illumination sources, wherein each of the plurality of illumination sources is coupled to a respective extension of the plurality of extensions of the ring-shaped PCB, and an optically clear adhesive (OCA) layer coupling at least a portion of the ring-shaped PCB with at least a portion of the lens;

providing, via the one or more processors, a second control signal to one or more imaging devices for capturing image data of an eye of a user wearing the pair of smart glasses, wherein the one or more imaging devices are coupled with the frame; and determining, by the one or more processors, a gaze associated with the eye of the user wearing the pair of smart glasses based on the image data.

12. The non-transitory computer-readable medium of claim 11, wherein the first control signal controls one or more of a power, a voltage, and a current provided to the plurality of illumination sources.

13. The non-transitory computer-readable medium of claim 11, wherein the first control signal is configured to individually control one or more illumination sources of the plurality of illumination sources to compensate for changes in performance caused by temperature variation associated with the plurality of illumination sources.

14. The non-transitory computer-readable medium of claim 11, wherein the frame includes a tapered edge and at least one imaging device of the one or more imaging devices coupled with the tapered edge.

15. The non-transitory computer-readable medium of claim 11, wherein the image data of the eye of the user wearing the pair of smart glasses includes glint image data associated with at least one reflection of the eye caused by the illumination of the plurality of illumination sources.

16. A method performed at a pair of smart glasses, the method comprising:

providing, via one or more processors of the pair of smart glasses, a first control signal to a ring-shaped printed circuit board (PCB) for illuminating a plurality of illumination sources communicatively coupled with the ring-shaped PCB via a plurality of conductive traces, wherein the ring-shaped PCB and the plurality of illumination sources are part of an optical stack coupled with a frame of the pair of smart glasses, the optical stack including:

a including a rigid transparent substrate for i) mechanically supporting the ring-shaped PCB and ii) controlling a perceived distance of a displayed image, the ring-shaped PCB having a plurality of extensions extending from the ring-shaped PCB, the plurality of illumination sources, wherein each of the plurality of illumination sources is coupled to a respective extension of the plurality of extensions of the ring-shaped PCB, and an optically clear adhesive (OCA) layer coupling at least a portion of the ring-shaped PCB with at least a portion of the lens;

providing, via the one or more processors, a second control signal to one or more imaging devices for capturing image data of an eye of a user wearing the pair of smart glasses, wherein the one or more imaging devices are coupled with the frame; and determining, by the one or more processors, a gaze associated with the eye of the user wearing the pair of smart glasses based on the image data.

17. The method of claim 16, wherein the first control signal controls one or more of a power, a voltage, and a current provided to the plurality of illumination sources.

18. The method of claim 16, wherein the first control signal is configured to individually control one or more illumination sources of the plurality of illumination sources to compensate for changes in performance caused by temperature variation associated with the plurality of illumination sources.

19. The method of claim 16, wherein the frame includes a tapered edge and at least one imaging device of the one or more imaging devices coupled with the tapered edge.

20. The method of claim 16, wherein the image data of the eye of the user wearing the pair of smart glasses includes glint image data associated with at least one reflection of the eye caused by the illumination of the plurality of illumination sources.

* * * * *